US011335042B2

(12) United States Patent
Batra et al.

(10) Patent No.: US 11,335,042 B2
(45) Date of Patent: May 17, 2022

(54) EXTENDING FREEFORM GRADIENTS TO SUPPORT ADVANCED CURVE PRIMITIVES

(71) Applicant: Adobe Inc., San Jose, CA (US)

(72) Inventors: Vineet Batra, Pitam Pura (IN); Ankit Phogat, Noida (IN); Matthew Fisher, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 126 days.

(21) Appl. No.: 16/933,334

(22) Filed: Jul. 20, 2020

(65) Prior Publication Data

US 2022/0020187 A1    Jan. 20, 2022

(51) Int. Cl.
*G06T 11/20*    (2006.01)
*G06T 11/00*    (2006.01)
*G06T 11/60*    (2006.01)

(52) U.S. Cl.
CPC .......... *G06T 11/203* (2013.01); *G06T 11/001* (2013.01); *G06T 11/60* (2013.01)

(58) Field of Classification Search
CPC ....... G06T 11/203; G06T 11/001; G06T 11/60
See application file for complete search history.

(56) References Cited

U.S. PATENT DOCUMENTS

| 10,242,464 | B1 | 3/2019 | Phogat et al. | |
|---|---|---|---|---|
| 10,489,946 | B1 | 11/2019 | Batra et al. | |
| 2004/0164992 | A1* | 8/2004 | Gangnet | G06T 11/001 345/591 |
| 2019/0206100 | A1* | 7/2019 | Batra | G06T 11/203 |

OTHER PUBLICATIONS

Adobe. FreeForm Gradients. https://www.youtube.com/watch?v=eE9nhgkRz2U, 2018.

Vineet Batra, Ankit Phogat, and Mridul Kavidayal. General primitives for smooth coloring of vector graphics. In ACM SIGGRAPH 2018 Posters, SIGGRAPH '18, New York, NY, USA, 2018. Association for Computing Machinery.

Alexandrina Orzan, Adrien Bousseau, Holger Winnemöller, Pascal Baria, Joëlle Thollot, and David Salesin. Diffusion curves: A vector representation for smooth-shaded images, 2008.

* cited by examiner

*Primary Examiner* — Jennifer Mehmood
*Assistant Examiner* — Andrew Shin
(74) *Attorney, Agent, or Firm* — Keller Preece PLLC

(57) ABSTRACT

Methods, systems, and non-transitory computer readable storage media are disclosed for utilizing enhanced curve primitives to modify color gradients in vector-based graphics. To illustrate, the disclosed system can receive an input of a curve to insert into a portion of a vector-based graphic including a mesh for a color gradient. The disclosed system can then insert a discontinuity into the mesh by adding a plurality of vertices to the mesh defining two unconnected edges at the position of the curve within the portion of the vector-based graphic. After inserting the discontinuity into the mesh, the disclosed system can determine colors for the edges of the discontinuity based on one or more user-selected colors and/or one or more colors associated with the color gradient. The disclosed system can then update the color gradient in response to determining the colors for the edges of the discontinuity.

20 Claims, 11 Drawing Sheets

EXTENDING FREEFORM GRADIENTS TO SUPPORT ADVANCED CURVE PRIMITIVES

BACKGROUND

Vector-based graphics are an important component in many digital graphics environments. Specifically, vector-based graphics can provide lossless scaling of images, which is particularly useful in converting digital images to print. Recent advancements in vector-based graphic technology have led to further improvements in applying color gradients to vector-based graphics. By applying color gradients to vector-based graphics, digital imaging systems can provide more realistic imagery similar to raster-based graphics while maintaining the advantage of lossless scaling over raster-based graphics.

Due to the nature of vector-based graphics, however, conventional digital imaging systems that provide color gradients to vector-based graphics have limited flexibility. Specifically, some conventional digital imaging systems utilize mesh structures to apply freeform gradient shading across a specified area of a vector-based graphic. Although freeform gradient shading utilizing such mesh structures allows for compact and resolution independent representation of a digital scene, conventional freeform gradient shading is limited to smooth shading. Specifically, the conventional systems utilize meshes that are continuous domains that compute colors for different points within specific regions using barycentric interpolation.

Furthermore, conventional systems also have limited accuracy. For example, vectorizing raster-based graphics can generate listlessly scalable versions of the raster-based graphics. Conventional vectorization systems that utilize vectorization processes to convert raster-based graphics into vector-based graphics, however, are generally incapable of accurately converting raster-based graphics that include shading (e.g., as is common in photographs of real-world objects). Specifically, because conventional vectorization systems are typically only capable of creating vector primitives with solid, filled colors, these systems typically output vector files with excessive geometry, rendering the conversion results unsatisfactory. Furthermore, utilizing processes associated with conventional freeform gradient shading during vectorization can also results in inaccurate results due to the inability of conventional freeform gradient shading to represent sharp color boundaries. Thus, there are several technological shortcomings with regard to conventional digital image editing and vectorization systems.

SUMMARY

One or more embodiments provide benefits and/or solve one or more of the foregoing or other problems in the art with systems, methods, and non-transitory computer readable storage media that utilizes enhanced curve primitives to modify color gradients in vector-based graphics. To illustrate, the disclosed systems can receive an input of a curve to insert into a portion of a vector-based graphic in which a color gradient is applied using a mesh. The disclosed systems can then insert a discontinuity into the mesh by adding a plurality of vertices to the mesh defining two unconnected edges at the position of the curve within the portion of the vector-based graphic. After inserting the discontinuity into the mesh, the disclosed systems can update the color gradient in response to insertion of the discontinuity. By inserting the discontinuity into the mesh for the color gradient, the disclosed systems can prevent color diffusion across the discontinuity and provide more flexibility within the color gradient.

Additional features and advantages of one or more embodiments of the present disclosure will be set forth in the description below.

BRIEF DESCRIPTION OF THE DRAWINGS

Various embodiments will be described and explained with additional specificity and detail through the use of the accompanying drawings in which.

DETAILED DESCRIPTION

Figure 1:
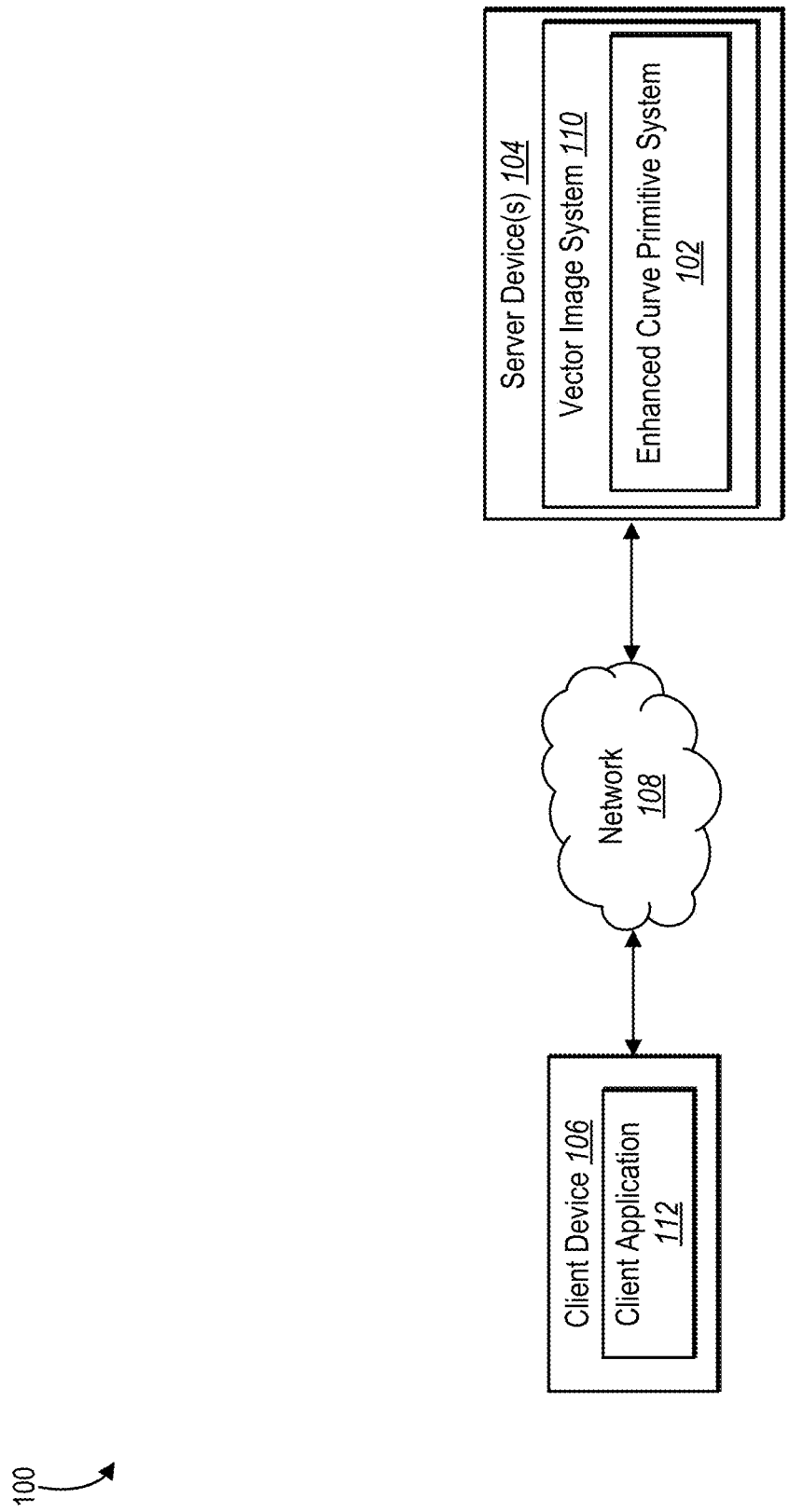
FIG. 1 illustrates an example system environment in which an enhanced curve primitive system can operate in accordance with one or more implementations.

One or more embodiments of the present disclosure include an enhanced curve primitive system. In particular, the enhanced curve primitive system can utilize enhanced curve primitives to modify color gradients in vector-based graphics. To illustrate, the enhanced curve primitive system can modify a mesh (e.g., a triangle mesh) corresponding to a color gradient within a portion of a vector-based graphic based on an input curve. Specifically, the enhanced curve primitive system can insert a plurality of vertices corresponding to the input curve within the mesh to define two unconnected edges that introduce a discontinuity or tear into the mesh. By introducing the discontinuity into the mesh, the enhanced curve primitive system can modify a color diffusion across the portion of the vector-based graphic associated with the color gradient. For example, the discontinuity can act as a color barrier. Additionally, the discontinuity can also function as a new primitive for diffusion coloring. In particular, the enhanced curve primitive system can apply colors to one or more of the edges of the discontinuity in response to a user selection of one or more colors (e.g., for one or more edges) or based on the existing colors within the color gradient (e.g., to change how the existing colors diffuse within the portion of the vector-based graphic). For example, the enhanced curve primitive system can diffuse color from a single side of the discontinuity or diffuse two different colors on either side of the discontinuity. Thus, the enhanced curve primitive system can allow for flexibly customizing the color gradient within a vector-based graphic without changing the underlying representation of the mesh.

As mentioned, the enhanced curve primitive system can receive an input of a curve to insert into a portion of a vector-based graphic. For example, the vector-based graphic can include at least one previously defined portion based on one or more vector lines or curves. Additionally, the portion of the vector-based graphic includes a color gradient defined using a mesh, such as a triangle mesh. In one or more embodiments, the enhanced curve primitive system utilizes the mesh to determine a diffusion of color across the portion of the vector-based graphic to generate a color gradient according to one or more defined color values within the portion of the vector-based graphic.

In response to receiving the input of the curve, the enhanced curve primitive system can insert a discontinuity into the mesh for the color gradient at the position of the curve. Specifically, the enhanced curve primitive system can insert the discontinuity by converting the curve into a polyline with a plurality of vertices. The enhanced curve primitive system can then insert the polyline into the mesh for the color gradient by connecting the vertices of the polyline to existing vertices in the mesh. Additionally, the enhanced curve primitive system can generate a pair of unconnected edges at the location of the curve by duplicating the vertices of the polyline within the mesh in the same positions of the polyline vertices. More specifically, in one or more embodiments, the enhanced curve primitive system can identify mesh triangles that have vertices along the polyline and determine a winding order of each of the identified mesh triangles. The enhanced curve primitive system can use the winding order information for each mesh triangle to determine to which edge each vertex (or duplicated vertex) of the polyline belongs.

In response to determining edges of the discontinuity within the mesh of the color gradient, in one or more embodiments, the enhanced curve primitive system can determine colors for the edges of the discontinuity. For example, the enhanced curve primitive system can determine colors based on user selection of one or more colors or based on colors associated with the color gradient. In particular, in various embodiments, the enhanced curve primitive system can determine a color for one or both edges by assigning a user-selected color to one or both of the edges of the discontinuity. Alternatively, the enhanced curve primitive system can determine a color for one or more of the edges based on color values associated with the color gradient. Thus, the enhanced curve primitive system can insert new colors into the color gradient at one or both sides of the discontinuity or create a barrier without inserting new colors at either edge.

In any event, the enhanced curve primitive system can update the color gradient. In one or more embodiments, the enhanced curve primitive system can update the color gradient by recalculating colors associated with vertices in the mesh based on the discontinuity provided by the curve. For instance, the enhanced curve primitive system can update the color gradient by modifying a diffusion of the existing colors across the portion of the vector-based graphic (e.g., by preventing diffusion across the discontinuity). Furthermore, in response to determining one or more new colors for one or more of the edges, the enhanced curve primitive system can determine color diffusions based on the one or more new colors and the colors associated with the color gradient.

Specifically, the enhanced curve primitive system can modify an existing color gradient of a vector-based graphic according to a curve inserted into the vector-based graphic. For example, based on the position of the curve in a portion of the vector-based graphic, the enhanced curve primitive system can utilize the curve to form a barrier within the vector-based graphic. The enhanced curve primitive system can use such a barrier to prevent diffusion of colors of the color gradient from one side of the barrier to the other. Accordingly, the enhanced curve primitive system can introduce sharp color boundaries into a previously smooth color gradient.

In additional embodiments, the enhanced curve primitive system can determine different colors for each side of a curve inserted into an existing color gradient of a portion of a vector-based graphic. To illustrate, the enhanced curve primitive system can insert additional colors into the color gradient by adding a first color to a first side of the curve and a second color to a second side of the curve. The enhanced curve primitive system can thus modify the color gradient across the portion of the vector-based graphic based on the previously assigned colors and the newly inserted colors along each side of the curve. Alternatively, the enhanced curve primitive system may assign an additional color to only one side of the curve, such that one side of the curve introduces another color into the color gradient, while the other side of the curve acts as a barrier curve for the previously assigned color on that side of the curve.

Additionally, in one or more embodiments, the enhanced curve primitive system can utilize enhanced curve primitives to automatically convert raster-based graphics to vector-based graphics. For example, the enhanced curve primitive system can vectorize portions of raster-based graphics with shading by automatically inserting curves (and corresponding discontinuities) into color gradients to represent sharp color boundaries in the raster-based graphics. Additionally, the enhanced curve primitive system can detect colors at the sharp color boundaries to determine colors for edges of the inserted discontinuities. The enhanced curve primitive system can thus represent different gradients detected in raster-based graphics (e.g., with open curve primitives) using enhanced curve primitives.

The disclosed enhanced curve primitive system can provide a number of advantages over conventional systems. For example, the enhanced curve primitive system can improve the accuracy of computing devices that implement creation, editing, and display of vector-based graphics. To illustrate, while some conventional models that utilize freeform gradient shading are limited to representing smooth shading in vector-based graphics, the enhanced curve primitive system can provide modified color gradients to represent sharp color transitions. Indeed, by modifying the underlying mesh associated with a color gradient, the enhanced curve primitive system can provide more accurate and realistic imagery via more realistic color transitions.

In addition to provide greater accuracy in creating new vector-based graphics, the enhanced curve primitive system also provides improved accuracy in vectorizing raster-based graphics. Specifically, as mentioned, conventional systems are limited to representing gradients of raster-based graphics with smooth shading that often result in inaccurate or unwieldy results. In contrast, the enhanced curve primitive system can vectorize raster-based graphics with complex shading and boundaries by inserting discontinuities directly into gradient meshes. To illustrate, the enhanced curve primitive system can insert discontinuities to represent many different color boundaries and transitions with significantly fewer vectors (e.g., curves or lines) than conventional systems.

Furthermore, the enhanced curve primitive system can also improve flexibility of computing devices in vector-based graphics processing. Specifically, in contrast to conventional systems that utilize freeform gradients or diffusion curves, the enhanced curve primitive system can flexibly provide open curve primitives that mix sharp color transitions with diffused color transitions at the ends of the sharp color transitions. For example, the enhanced curve primitive system can convert any curve input into an enhance curve primitive that modifies an existing color gradient by directly inserting a discontinuity into a mesh corresponding to the color gradient. The enhanced curve primitive system thus provides options for modifying vector-based graphics and generating more realistic imagery than the existing imaging systems. Furthermore, a generated mesh needs no specialized handling for rendering and is compatible with PDF as Type 4 shading.

In addition to the foregoing, the enhanced curve primitive system can provide one or more of the foregoing technological improvements without requiring expensive computations. Indeed, as only vertices belonging to the discontinuity are duplicated, the enhanced curve primitive system has minimal computational overhead.

As illustrated by the foregoing discussion, the present disclosure utilizes a variety of terms to describe features and advantages of the enhanced curve primitive system. Additional detail is now provided regarding the meaning of such terms. For example, as used herein, the term "vector-based graphic" refers to a digital image including one or more mathematical paths to form shapes within the digital image. For example, a vector-based graphic can include one or more curves defining one or more shapes. In some embodiments, a vector-based graphic can include image content stored in vector file formats such as SVG, EPS, and PDF.

As used herein, the term "curve" refers to a continuous function that extends from an initial point to a terminal point. Specifically, a curve can include a straight or a curved line that is continuous along a single path. Additionally, a curve can include a plurality of segments (e.g., line portions) connecting a plurality of lines (e.g., one or more curved lines and/or one or more straight lines) in a continuous path from an initial point to a terminal point. In one or more embodiments, a curve can include one or more Bezier paths and/or one or more straight lines. Additionally, the term "curve primitive" refers to a geometric curve that a computing device processes for generating a vector-based graphic.

As used herein, the term "polyline" refers to a segmented curve including a plurality of line segments connected by a plurality of vertices. For example, the enhanced curve primitive system can convert a curve into a polyline by generating a segmented line having the same shape as the curve. Thus, a polyline can represent a curve with a plurality of vertices that the enhanced curve primitive system can insert into a mesh by connecting vertices of the polyline to other vertices in the mesh.

Additionally, as used herein, the terms "portion of a vector-based graphic" and "portion" refers to a region of a vector-based graphic associated with a curve of the vector-based graphic. For instance, a portion of a vector-based graphic can include a region of a vector-based graphic inside, or at least partially formed by, (and including) a path corresponding to the vector-based graphic. Accordingly, a vector-based graphic can include a plurality of portions corresponding to a plurality of curves. Furthermore, portions of a vector-based graphic can overlap, such that the vector editing system can determine which portion to display to a user based on layering information (e.g., whether a given curve/portion is "in front of" or "behind" another curve/portion).

As used herein, the term "color gradient" refers to a range of position-dependent colors across a region of an image. For example, a color gradient can include a range of colors across a portion of a vector-based graphic, such as a range of colors used to fill the portion of the vector-based graphic. In one or more embodiments, a color gradient is based on one or more color points that define one or more initial color values (e.g., assigned to specific points at specific locations) that are then diffused across a portion of a vector-based graphic (e.g., by blending the one or more colors with each other or with a transparency).

Furthermore, as used herein, the terms "mesh" and "gradient mesh" refer to a structure of vertices and polygons. For example, a mesh can include a triangle mesh that includes a plurality of vertices that form a plurality of triangles across a portion of a vector-based graphic. Additionally, each vertex in the mesh can be assigned a color value to generate a color gradient across the portion. For instance, by assigning each vertex in a mesh a specific color value, the enhanced curve primitive system can generate a color gradient within a portion of a vector-based graphic. As used herein, the term "vertex" refers to an individual point within a mesh that connects to other vertices in the mesh. For example, vertices can connect to form polygons (e.g., triangles) within a mesh, such that the mesh can be formed from a plurality of polygons.

As used herein, the terms "discontinuity" and "tear" refer to a separation of vertices within a mesh for a color gradient. Specifically, a discontinuity inserted into a mesh for a color gradient can prevent diffusion of color across the discontinuity. Furthermore, the discontinuity may not correspond to a visual discontinuity (e.g., a visible gap). In addition, as used herein, the term "edge" refers to a plurality of connected vertices on one side of a discontinuity. Accordingly, a discontinuity can include two edges on opposing sides. Furthermore, each edge in a discontinuity can be unconnected from the other edge in the discontinuity.

As used herein, the term "winding order" refers to a reference order of vertices of a polygon within a mesh. For example, a winding order for a polygon can include a classification of clockwise indicating a clockwise reference order of vertices within a polygon or a classification of counter-clockwise indicating a counter-clockwise reference order of vertices within a polygon. In one or more embodiments, the enhanced curve primitive system can utilize a winding order of polygons having vertices along a polyline to determine to which edge of a discontinuity each polygon belongs.

Additional detail will now be provided regarding the enhanced curve primitive system in relation to illustrative figures portraying exemplary implementations. To illustrate, FIG. 1 includes an embodiment of a system environment 100 in which an enhanced curve primitive system 102 can operate. In particular, the system environment 100 includes server device(s) 104 and a client device 106 in communication via a network 108. Moreover, as shown, the server device(s) 104 include a vector image system 110, which includes the enhanced curve primitive system 102. Additionally, the client device 106 can include a client application 112.

As shown in FIG. 1, the server device(s) 104 can include or host the vector image system 110. The vector image system 110 can include, or be part of, one or more systems that implement the creation, editing, or display of vector-based graphics. For example, the vector image system 110 can provide tools for viewing, generating, editing, and/or otherwise interacting with vector-based graphics. As noted previously, vector-based graphics provide lossless scaling, making vector-based graphics especially suitable for generating physical versions of digital media. Accordingly, the vector image system 110 can use the vector-based graphics in a variety of applications such as databases of vector-based graphics, digital media, print media, or other environments that utilize vector-based graphics. In one or more embodiments, the vector image system 110 can provide vector-based graphics to another system such as a system/application at the client device 106 or a third-party system.

Furthermore, the vector image system 110 can provide tools for applying color to vector-based graphics. For instance, the vector image system 110 can provide tools for inserting color gradients into portions of vector-based graphics. To illustrate, the vector image system 110 can provide tools to fill one or more portions of the vector-based graphics with color gradients according to color values and positions of the color values selected by a user of the client device 106.

In connection with providing tools for applying color (e.g., color gradients) to vector-based graphics, the vector image system 110 can utilize the enhanced curve primitive system 102 to modify color gradients in portions of the vector-based graphics. In particular, the vector image system 110 can utilize the enhanced curve primitive system 102 to receive an input of a curve within a portion of a vector-based graphic to modify an existing color gradient. The vector image system 110 can then utilize the enhanced curve primitive system 102 to process the curve and insert a discontinuity into a mesh that the enhanced curve primitive system 102 uses to apply the color gradient to the portion of the vector-based graphic. Additionally, the vector image system 110 can utilize the enhanced curve primitive system 102 to determine colors for each edge in the discontinuity and then update the color gradient based on the determined colors. For example, in one or more embodiments, determining colors for an edge in a discontinuity can include assigning colors to each vertex in the edge based on an updated gradient diffusion or based on a specifically selected color for the edge. Thus, the enhanced curve primitive system 102 may determine colors for the edges (e.g., by assigning colors to the edges or vertices of the edges) in accordance with modifying an existing color gradient (e.g., without adding new colors) or for inserting additional colors into a color gradient. The vector image system can also generate an updated vector-based graphic according to the updated color gradient.

In one or more embodiments, after modifying a color gradient of a portion of a vector-based graphic using the enhanced curve primitive system 102, the vector image system 110 can provide the updated vector-based graphic to the client device 106 via the network 108. For example, the vector image system 110 can provide the updated vector-based graphic for rendering at the client device 106 on a display device using the client application 112. Additionally, the client application 112 can include a digital content editing application (e.g., a vector image editing application) that provides tools for viewing, generating, editing, or otherwise interacting with vector-based graphics. The client device 106 can thus present a vector-based graphic within the client application 112 to allow a user to view, edit, or otherwise interact with the vector-based graphic. In particular, as previously mentioned, utilizing enhanced curve primitives to modify a color gradient in a vector-based graphic improves the accuracy and flexibility of rendering realistic color transitions and boundaries in vector-based graphics.

The enhanced curve primitive system 102 can further utilize enhanced curve primitives to provide improved accuracy in vectorizing raster-based graphics. For example, the vector image system 110 can import raster-based graphics from another source (e.g., an external system or the client device 106). The vector image system 110 can utilize the enhanced curve primitive system 102 to analyze the raster-based graphic and generate a vector-based graphic according to detected characteristic of the raster-based graphic (e.g., object edges and/or color boundaries/transitions. To illustrate, the enhanced curve primitive system 102 can generate color gradients for one or more portions of an output vector-based graphic and insert one or more discontinuities into the output vector-based graphic, along with any customized color values to ensure accurate reconstruction of the raster-based graphic as a vector-based graphic.

In addition, as shown in FIG. 1, the system environment 100 includes the client device 106. The client device 106 can include, but is not limited to, a mobile device (e.g., smartphone or tablet), a laptop, a desktop, including those explained below with reference to FIG. 10. Furthermore, although not shown in FIG. 1, the client device 106 can be operated by a user (e.g., a user included in, or associated with, the system environment 100) to perform a variety of functions. In particular, the client device 106 can perform functions such as, but not limited to, accessing, viewing, and interacting with a variety of digital content (e.g., vector-based graphics or other digital media). The client device 106 can also perform functions for generating, capturing, or accessing data to provide to the vector image system 110 and the enhanced curve primitive system 102 in connection with vector-based graphics. For example, the client device 106 can communicate with the server device(s) 104 via the network 108 to provide information associated with vector-based graphics and color gradients. Although FIG. 1 illustrates the system environment 100 with a single client device 106, the system environment 100 can include a different number of client devices.

In one or more embodiments, the server device(s) 104 include a variety of computing devices, including those described below with reference to FIG. 9. For example, the server device(s) 104 can include one or more servers for storing and processing data associated with vector image applications. The server device(s) 104 can also include a plurality of computing devices in communication with each other, such as in a distributed storage environment. In some embodiments, the server device(s) 104 comprise a content server. The server device(s) 104 can also comprise an application server, a communication server, a web-hosting server, a social networking server, a digital content campaign server, or a digital communication management server.

Additionally, as shown in FIG. 1, the system environment 100 includes the network 108. The network 108 can enable communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 may communicate via the network using a variety of communication platforms and technologies suitable for transporting data and/or communication signals, including any known communication technologies, devices, media, and protocols supportive of data communications, examples of which are described with reference to FIG. 9.

Although FIG. 1 illustrates the server device(s) 104 and the client device 106 communicating via the network 108, the various components of the enhanced curve primitive system 102 can communicate and/or interact via other methods (e.g., the server device(s) 104 and the client device 106 can communicate directly). Furthermore, although FIG. 1 illustrates the enhanced curve primitive system 102 being implemented by a particular component and/or device within the system environment 100, the enhanced curve primitive system 102 can be implemented, in whole or in part, by other computing devices and/or components in the system environment 100. For example, the enhanced curve primitive system 102 can be downloaded from the server device(s) 104 to the client device 106. Once downloaded, the client device 106 can implement the enhanced curve primitive system 102 (e.g., perform the methods and processes described herein) independent from the server device(s) 104.

Figure 2:
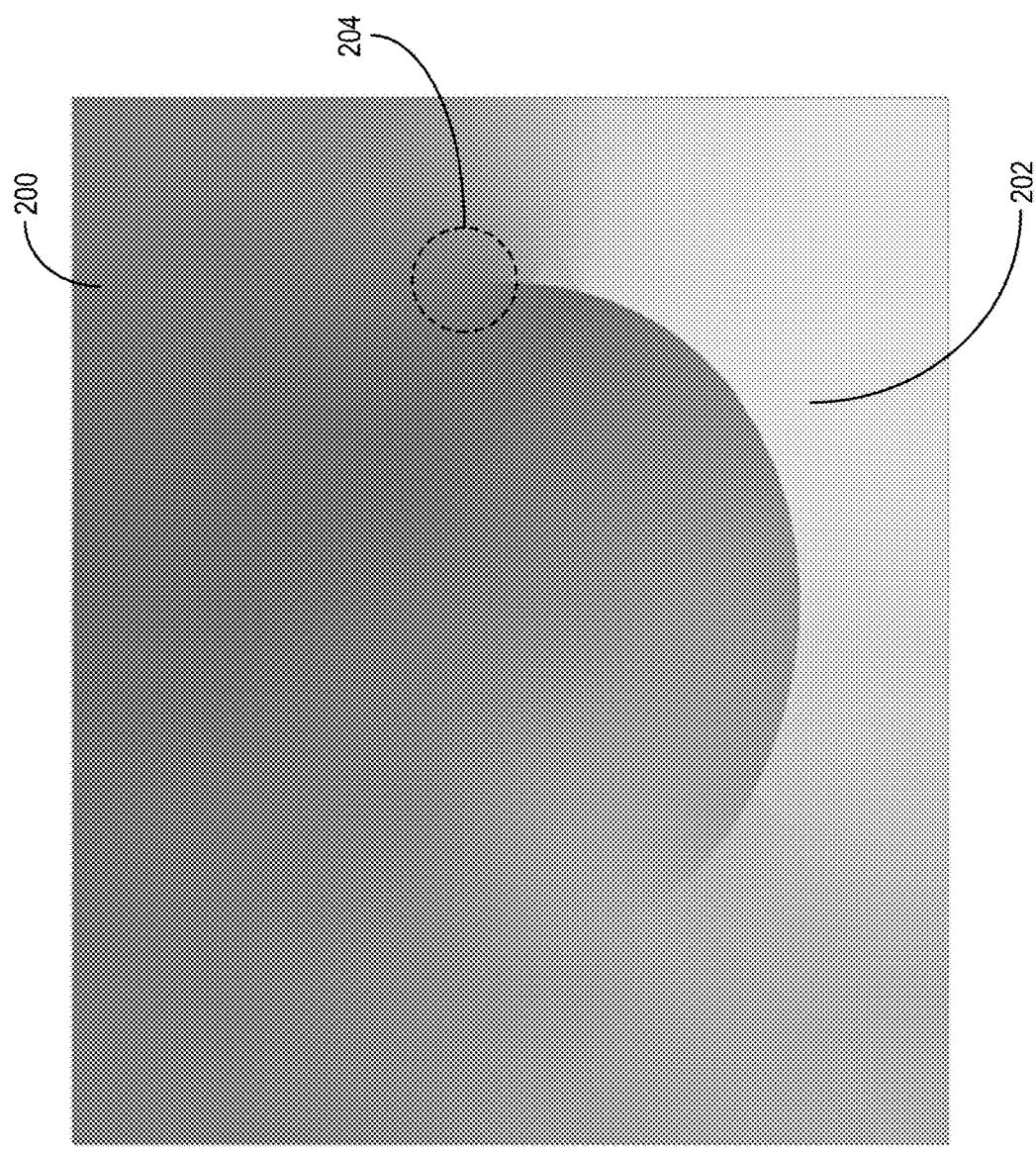
FIG. 2 illustrates a vector-based graphic including a color gradient with a discontinuity in accordance with one or more implementations.

As mentioned above, the enhanced curve primitive system 102 can accurately and flexibly insert sharp color transitions into color gradients within vector-based graphics using enhanced curve primitives. FIG. 2 illustrates an example of an image 200 with a color gradient including a sharp color transition 202 within the color gradient. Specifically, FIG. 2 illustrates that the sharp color transition 202 extends across a portion of the image 200 without extending to edges of the image 200.

Because the sharp color transition 202 does not extend to the edges of the image 200, the result is in an open curve primitive with endpoints that are inside a boundary of the image 200. In particular, FIG. 2 illustrates that the sharp color transition 202 has at least one end point (e.g., endpoint 204) located within the color gradient. As shown, because the sharp color transition 202 ends inside the boundary of the image 200—and therefore, within a boundary of the color gradient—the colors of the color gradient diffuse from one side of the sharp color transition 202 to the other side of the sharp color transition 202 around the endpoint 204. Similarly, the colors of the color gradient diffuse around the other end of the sharp color transition 202.

As previously noted, existing systems are unable to generate vector-based images such as the image 200 of FIG. 2. In contrast, in one or more embodiments, the enhanced curve primitive system 102 can generate the image 200 via the use of a color gradient involving a plurality of colors to generate the diffusion of colors in the image 200. Furthermore, the enhanced curve primitive system 102 can create the sharp color transition 202 by inserting a curve in the gradient mesh at the location of the sharp color transition 202. As described in more detail below, the enhanced curve primitive system 102 can insert a discontinuity into the gradient mesh by inserting the curve into the gradient mesh as a polyline and duplicating the vertices of the polyline to create unconnected edges. The enhanced curve primitive system 102 can then update the color gradient based on color(s) assigned to the edges of the discontinuity.

Figure 3:
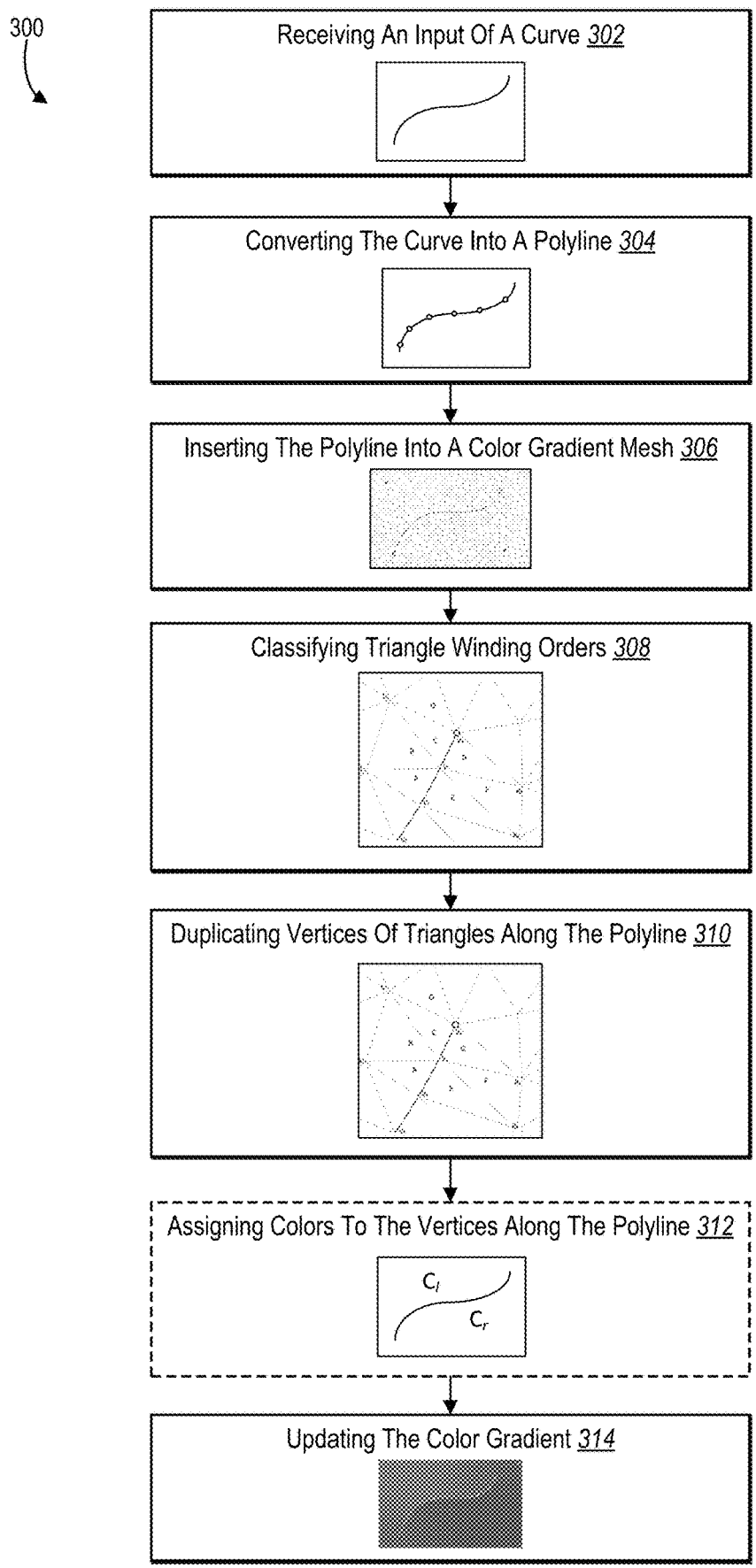
FIG. 3 illustrates a diagram of a process overview for modifying a color gradient in a vector-based graphic using an enhanced curve primitive in accordance with one or more implementations.

FIG. 3 and the accompanying description provide additional detail for the process of modifying a color gradient by inserting a discontinuity into the mesh for the color gradient. Specifically, FIG. 3 illustrates an overview of a process for updating a color gradient based on an input curve. FIG. 3 illustrates that the enhanced curve primitive system 102 performs acts 300 for inserting a discontinuity into a gradient mesh for a color gradient in a vector-based graphic and then using the discontinuity to modify the color gradient within the vector-based graphic.

As illustrated in FIG. 3, the acts 300 include an act 302 of receiving an input of a curve. In one or more embodiments, the enhanced curve primitive system 102 can receive an input to insert a curve at a location within a portion of a vector-based graphic. The portion of the vector-based graphic can include a region to which a color gradient has previously been applied. For example, the portion can include an area within a shape of the vector-based graphic defined by one or more curves. Accordingly, applying a color gradient to the portion can include filling the portion with a diffusion or blending of one or more colors (and in some instances a transparency) across the portion.

After—or otherwise in connection with—applying a color gradient to the portion of the vector-based graphic, the enhanced curve primitive system 102 can determine a location of the curve within the portion. To illustrate, the enhanced curve primitive system 102 can determine the position based on an entirety of the curve (e.g., the position includes each point along a length of the curve). Accordingly, the position of the curve can include each point from a first endpoint of the curve to a second endpoint of the curve. Additionally, because the curve may include a vector-based primitive, the enhanced curve primitive system 102 can determine the position using vector-based position information relative to other elements of the vector-based graphic. According to additional embodiments, the enhanced curve primitive system 102 can also receive inputs of a plurality of curves for modifying the color gradient.

Furthermore, as shown in FIG. 3, the acts 300 can include an act 304 of converting a curve into a polyline. Specifically, in one or more embodiments, the curve can include one or more curve segments or curved segments mixed with straight line segments. To convert the curve into a polyline, the enhanced curve primitive system 102 can create a plurality of straight line segments to represent curved portions and/or longer straight line segments. Thus, the enhanced curve primitive system 102 can recreate a curve as a plurality of continuous line segments connected by a plurality of points (vertices).

After the enhanced curve primitive system 102 converts the curve into a polyline, FIG. 3 illustrates that the acts 300 include an act 306 of inserting the polyline into a color gradient mesh. In particular, the enhanced curve primitive system 102 can insert the polyline corresponding to the curve into a triangle mesh for the color gradient at the position of the curve within the portion of the vector-based gradient. For example, the enhanced curve primitive system 102 can connect a plurality of existing vertices in the mesh to the plurality of vertices of the polyline via one or more segments. Connecting the vertices of the polyline to the existing vertices of the mesh results in a plurality of additional triangles in the triangle mesh for the color gradient.

In connection with inserting the polyline of the curve into the gradient mesh, the enhanced curve primitive system 102 can insert a discontinuity into the gradient mesh. Specifically, FIG. 3 illustrates that the acts 300 include an act 308 of classifying triangle winding orders. Additionally, FIG. 3 illustrates that the acts 300 include an act 310 of duplicating vertices of triangles along the polyline. Thus, to insert a discontinuity into a mesh, the enhanced curve primitive system 102 can first classify triangle winding orders and then duplicate the vertices of the polyline based on the triangle winding orders.

As mentioned, FIG. 3 illustrates that the acts 300 include an act 308 of classifying triangle winding orders. To illustrate, the enhanced curve primitive system 102 can identify triangles in the gradient mesh that have vertices along the polyline (e.g., the triangles share one or more vertices with the polyline). The enhanced curve primitive system 102 can classify each of the identified triangles as having a clockwise winding order or a counter-clockwise winding order with respect to the polyline.

FIG. 3 further illustrates that the acts 300 include an act 310 of duplicating vertices of triangles along the polyline. For instance, the enhanced curve primitive system 102 can use the winding orders of the triangles that share vertices along the polyline, as previously determined, to introduce a discontinuity or tear into the mesh at the position of the polyline. More specifically, the enhanced curve primitive system 102 can duplicate the vertices along the polyline and then use the winding orders of the triangles to determine to which edge each vertex (e.g., the original vertices and duplicated vertices) belong. By duplicating the vertices, the enhanced curve primitive system 102 can create two unconnected edges within the mesh at the position of the curve according to the winding orders of the triangles.

Additionally, FIG. 3 illustrates that the acts 300 optionally include an act 312 of assigning colors to the vertices along the polyline. In particular, the enhanced curve primitive system 102 can determine a first color value for one or more vertices in a first edge of a discontinuity and a second color value for one or more vertices in a second edge of the discontinuity. To illustrate, in one or more embodiments, one or more of the color values can be based on a user-selected color for at least one edge. Thus, the enhanced curve primitive system 102 can introduce at least one new color into the color gradient. In one or more embodiments, the enhanced curve primitive system 102 can assign one or more of the colors to edges in the discontinuity based on one or more previously determined color values in the color gradient. In this manner, the enhanced curve primitive system 102 can generate a discontinuity that acts as a barrier to prevent diffusion across the discontinuity or to introduce additional colors into the color gradient at the position of the curve.

FIG. 3 also illustrates that the acts 300 include an act 314 of updating the color gradient. Specifically, after assigning colors to the separate edges of a discontinuity, the enhanced curve primitive system 102 can update the color values of other vertices within the mesh. For instance, the enhanced curve primitive system 102 can determine a color diffusion within the portion of the vector-based graphic by calculating and assigning new color values to the vertices of the mesh. Because the color values in the color gradient are position dependent, the updated color values can be based on the positions of the corresponding vertices relative to one or more coloring primitives (e.g., color points or curves with associated color values) and/or one or more edges of the discontinuity.

Figure 4A:
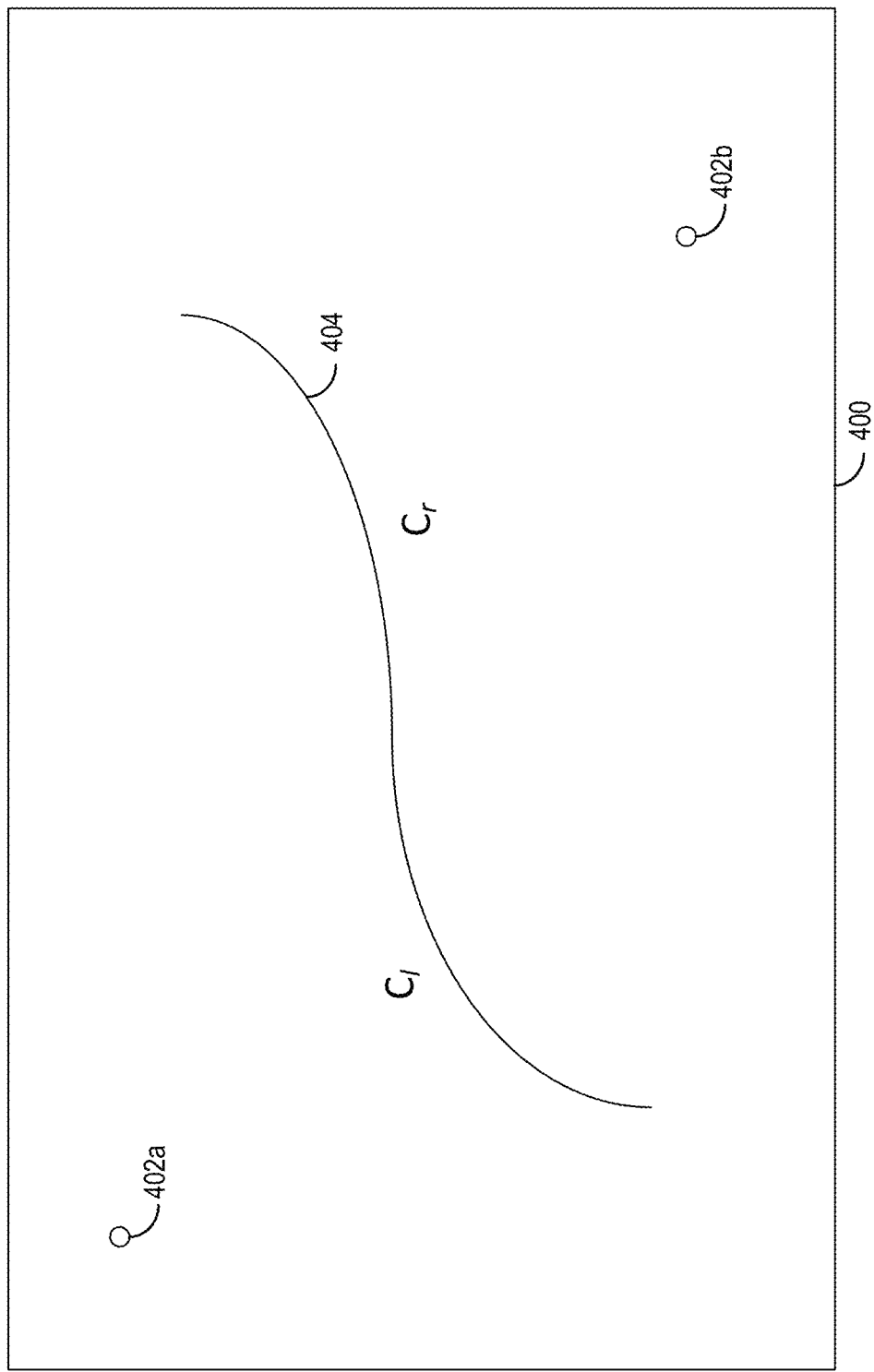
FIGS. 4A-4D illustrate vector-based graphics in a process for inserting a discontinuity into a portion of a vector-based graphic comprising a color gradient in accordance with one or more implementations.
Figure 4B:
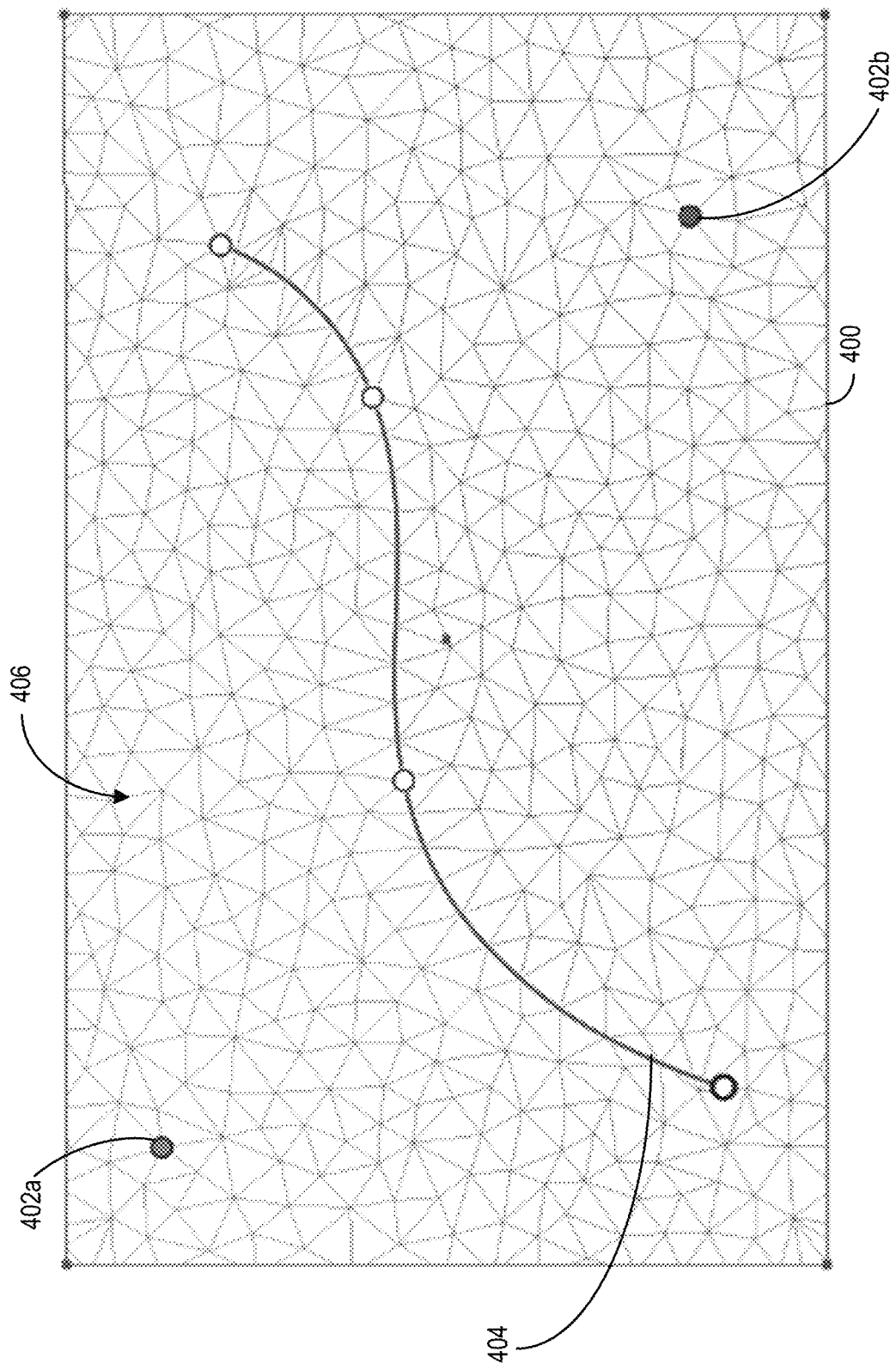
Figure 4C:
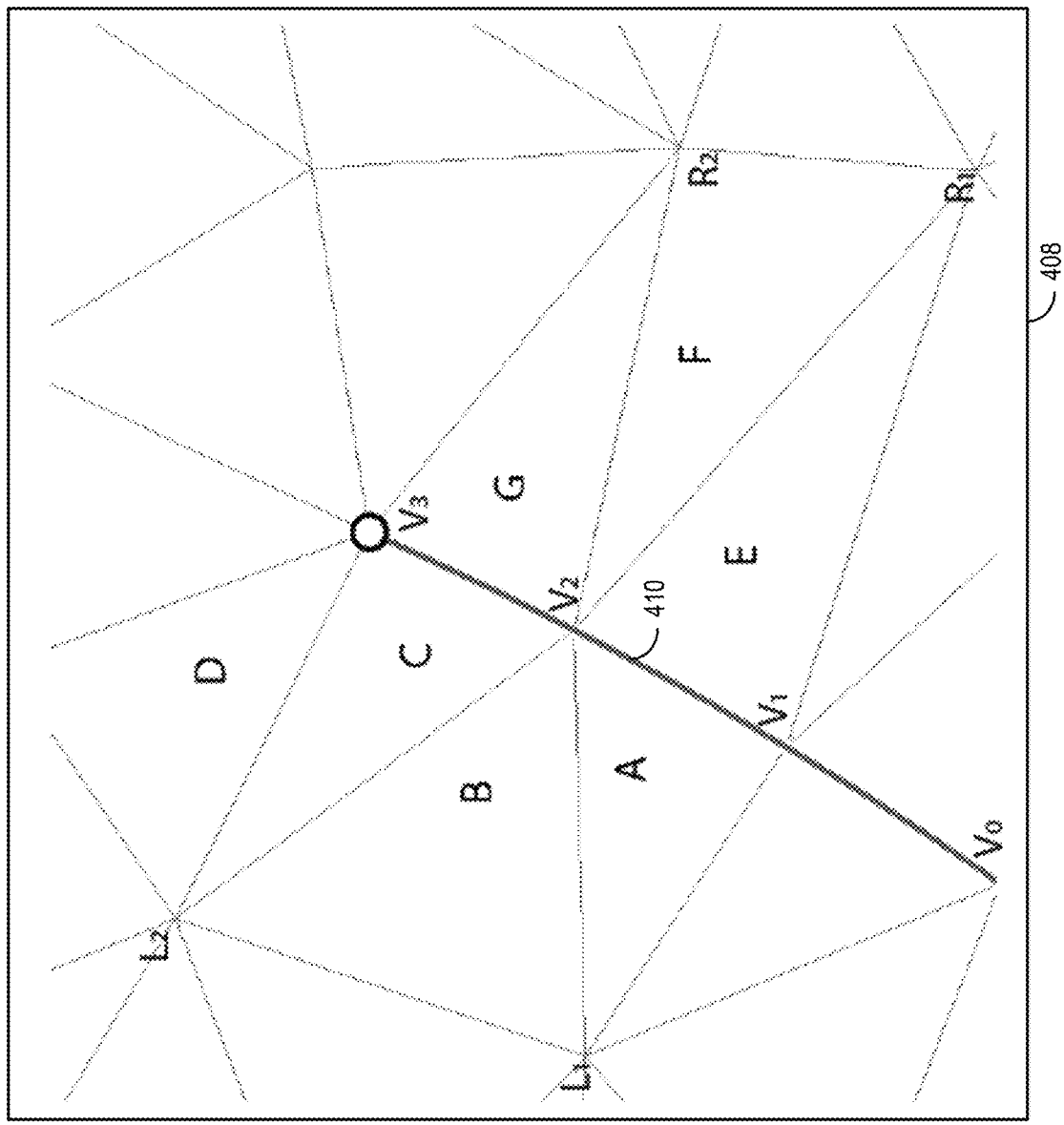
Figure 4D:
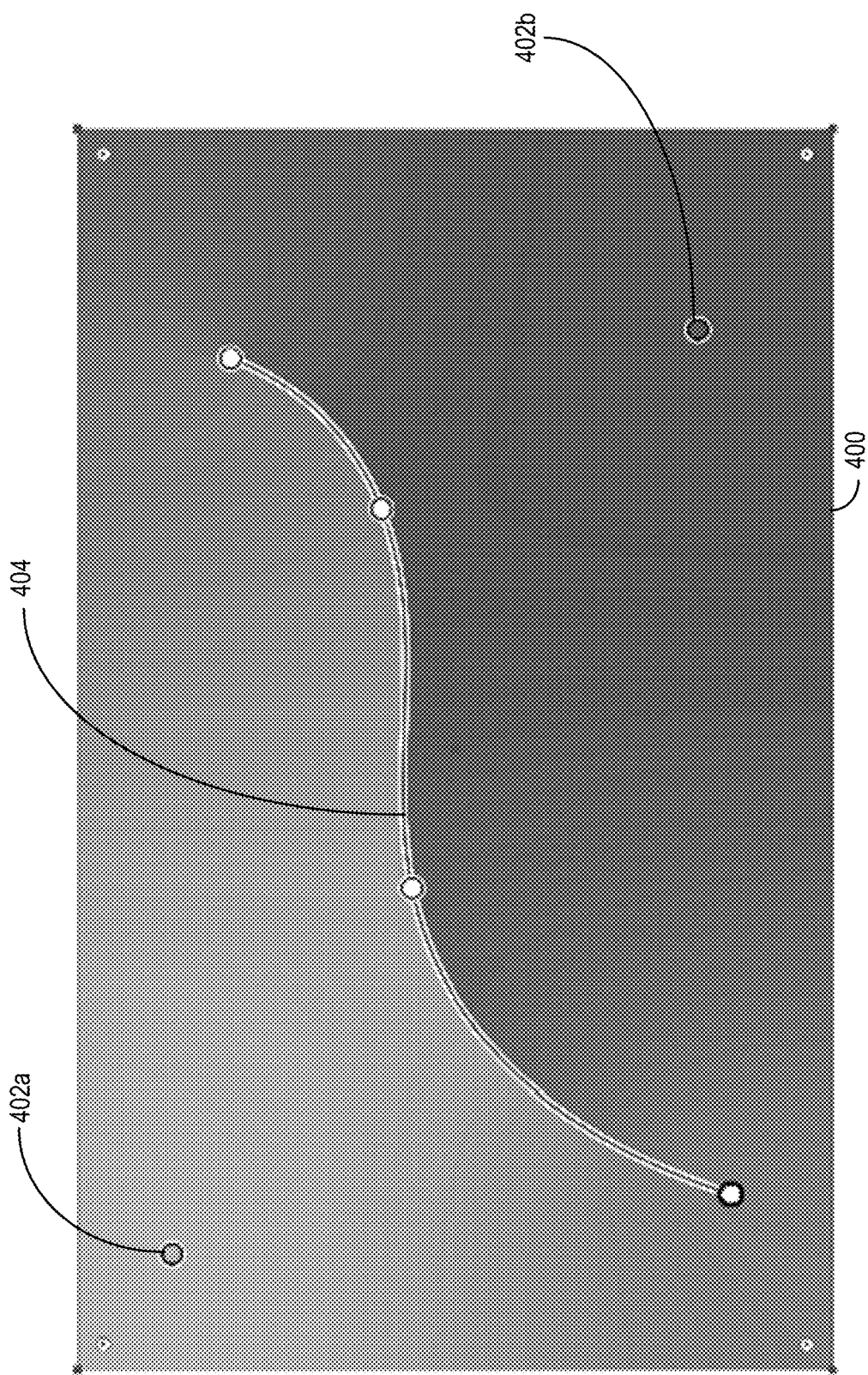

As described above, FIG. 3 provides an overview of the process for inserting a discontinuity into a gradient mesh and updating a color gradient. FIGS. 4A-4D illustrate additional detail associated with inserting a discontinuity into a gradient mesh and updating a color gradient. Specifically, FIG. 4A illustrates a diagram of a curve within a portion of a vector-based graphic. FIG. 4B illustrates a diagram of a gradient mesh including the curve within the portion of the vector-based graphic. FIG. 4C illustrates a close-up view of a gradient mesh including a curve. FIG. 4D illustrates the portion of the vector-based graphic with an updated color gradient.

As shown, FIG. 4A illustrates a portion 400 of a vector-based graphic. For example, the portion 400 of the vector-based graphic can include some or all of the vector-based graphic. The vector-based graphic can include any number of paths forming any number of different shapes. In some embodiments, the enhanced curve primitive system 102 can provide user interface tools (e.g., via a client application on a client device) for viewing, generating, editing, or otherwise interacting with the vector-based graphic. Accordingly, the enhanced curve primitive system 102 can provide tools for modifying or removing existing paths within the vector-based graphic or for adding additional paths to the vector-based graphic.

The enhanced curve primitive system 102 can also apply colors to the vector-based graphic. For example, the enhanced curve primitive system 102 can fill the portion 400 of the vector-based graphic with a color gradient by diffusing color across the portion 400 based on one or more initial color values. In some embodiments, as illustrated by FIG. 4A, the enhanced curve primitive system 102 determines the color gradient based on position-dependent color values associated with specific locations within the portion 400 of the vector-based graphic. For instance, the enhanced curve primitive system 102 can determine the color values for the color gradient in response to a selection, by a user, of one or more coloring primitives including any number of points (e.g., a first color point 402a and a second color point 402b) or curves along with associated color values. To illustrate, the enhanced curve primitive system 102 can determine the locations of one or more points or one or more curves within the portion 400 of the vector-based graphic based on a user input and assign color values to the one or more points or one or more curves. The color values associated with the coloring primitives can be initial values that the enhanced curve primitive system 102 utilizes to generate a gradient mesh.

In one or more embodiments, the enhanced curve primitive system 102 can utilize a mesh generation process, such as conforming Delaunay triangulation ("CDT"), to generate a triangle mesh within the portion of the vector-based graphic via triangulation of the space in the portion. As an example, processes for performing CDT are described in U.S. Pat. No. 10,489,946 and in U.S. Pat. No. 10,242,464, which are herein incorporated by reference in their entirety. The above-cited references also include detail for utilizing a mesh to apply a color gradient within a vector-based graphic. For example, in one or more embodiments and as shown in more detail in FIG. 4B, the enhanced curve primitive system 102 can utilize one or more points as coloring primitives and as Steiner points during the triangulation process. In some embodiments, the enhanced curve primitive system 102 can also utilize color curves to triangulate a mesh for a color gradient by sampling the curves adaptively and adding the curves as a set of connected edges during triangulation.

Furthermore, FIG. 4A illustrates that the enhanced curve primitive system 102 can also receive an input of a curve 404 to modify the color gradient. Specifically, as briefly described previously, the curve 404 can include a straight line path, a curved path (e.g., a Bezier curve or other parametric curve), or a combination of straight line paths and/or curved paths. In response to receiving the input of the curve 404 within the portion 400, the enhanced curve primitive system 102 can determine a position of the curve 404. For instance, the enhanced curve primitive system 102 can determine the position using the vector-based properties of the curve 404, which can indicate the relative position of the curve 404 with respect to one or more other elements of the vector-based graphic.

Additionally, the enhanced curve primitive system 102 can determine properties associated with the curve 404 for modifying the color gradient. In particular, the enhanced curve primitive system 102 can determine whether one or more sides of the curve 404 has a color value property. For example, in response to a user input to apply a color value property to a side of the curve (e.g., a left side $C_l$ or a right side $C_r$), the enhanced curve primitive system 102 can assign the color value property to the corresponding side. In at least some embodiments, the enhanced curve primitive system 102 can assign a color value property to one side or both sides of the curve 404. Alternatively, the enhanced curve primitive system 102 can determine that no color value property is assigned to any portion of the curve 404.

In additional embodiments, the enhanced curve primitive system 102 can also assign more than one color value property to a single side. For instance, if the curve 404 includes more than one segment (e.g., more than one straight line segment or curved segment), the enhanced curve primitive system 102 can assign different color value properties to the different segments. In another example in which the curve 404 includes a single segment (e.g., a single Bezier curve), the enhanced curve primitive system 102 can logically segment the curve 404 and then assign different color value properties to the different logical segments.

As mentioned, the enhanced curve primitive system 102 can generate the color gradient across the portion 400 of the vector-based graphic using a triangulated mesh for the color gradient. FIG. 4B illustrates the mesh 406 of the color gradient within the portion 400 of the vector-based gradient. Specifically, as illustrated, the mesh 406 includes a plurality of connected vertices associated with corresponding color values that result in a diffusion of colors across the portion 400 of the vector-based graphic. For example, based on initial color values associated with the first color point 402a and the second color point 402b, the enhanced curve primitive system 102 can assign a color value to each of the vertices to provide location-dependent coloring within the portion 400. Accordingly, as mentioned previously, the enhanced curve primitive system 102 can diffuse one or more colors across the portion 400 via the mesh 406.

In response to receiving the curve 404 and determining the position of the curve 404 within the portion 400 of the vector-based graphic, the enhanced curve primitive system 102 can insert the curve 404 into the mesh 406. In particular, the enhanced curve primitive system 102 can first convert (e.g., flatten) the curve 404 into a polyline comprising a plurality of connected segments. More specifically, the enhanced curve primitive system 102 can generate a plurality of straight line segments to represent the curve with a plurality of vertices to connect the segments in a continuous path. In one or more embodiments, the enhanced curve primitive system 102 can generate the polyline to include as many segments and vertices as needed to remove curved segments while accurately representing the curve 404. Thus, the number of segments and vertices may be dependent on the shape of the curve 404. Additionally, the number of segments and vertices may also be based on a set of constraints that ensure that the enhanced curve primitive system 102 can insert the curve 404 into the mesh 406.

To insert the polyline of the curve 404 into the mesh, the enhanced curve primitive system 102 can connect the vertices of the polyline to existing vertices within the mesh 406. To illustrate, the enhanced curve primitive system 102 can modify a portion of the mesh 406 by inserting vertices corresponding to the locations of the vertices of the polyline. The enhanced curve primitive system 102 can connect the inserted vertices to nearby vertices within the mesh via one or more connecting segments. For example, the enhanced curve primitive system 102 can add the vertices into the mesh 406 as Steiner points. Accordingly, the enhanced curve primitive system 102 can generate additional polygons (e.g., triangles) within the mesh 406 to fully integrate the new vertices into the mesh 406 and ensure that the polyline is traceable via connected edges within the mesh 406.

After adding the curve 404 to the mesh 406 as a polyline, the enhanced curve primitive system 102 can insert a discontinuity into the mesh 406. In particular, FIG. 4C illustrates a close-up view of a mesh 408 into which the enhanced curve primitive system 102 inserts a discontinuity based on a portion of a curve 410. For instance, after connecting the vertices (e.g., a subset of vertices $V_0$, $V_1$, $V_2$, $V_3$ in FIG. 4C) of the curve 410 into the mesh 408, the enhanced curve primitive system 102 generates duplicated vertices that lie along the curve 410 at the positions of the vertices. In one or more embodiments, the duplicated vertices are not connected to the original vertices.

Furthermore, the enhanced curve primitive system 102 connects the duplicated vertices to existing vertices only on one side of the curve 410. For example, in the embodiment of FIG. 4C, the enhanced curve primitive system 102 can connect the original vertices of the polyline to a first set of vertices on one side (e.g., vertex $R_1$, $R_2$). The enhanced curve primitive system 102 can also connect the duplicated vertices to a second set of vertices on the opposite side (e.g., vertices $L_1$, $L_2$). By duplicating the vertices and connecting the vertices and duplicated vertices to separate sides of the curve 410, the enhanced curve primitive system 102 can introduce a discontinuity into the mesh 408.

To duplicate the vertices of the curve 410 and generate the discontinuity, the enhanced curve primitive system 102 can determine a winding order associated with the triangles in the mesh 408. In particular, the enhanced curve primitive system 102 can determine a winding order for each triangle of the mesh 408 (or for each triangle in a vicinity of the curve 410) having vertices along the polyline of the curve 410. For example, the enhanced curve primitive system 102 can determine a winding order for a triangle with respect to the curve 410 by classifying a mesh triangles into one of four categories: (1) trivial, in which none of the vertices of a triangle lie along the curve 410; (2) clockwise, if a triangle having two vertices along the curve 410 is oriented in clockwise order; (3) counter-clockwise, if a triangle having two vertices along the curve 410 is oriented in a counter-clockwise order; and (4) endpoint, if a triangle has exactly one vertex along the curve 410. To illustrate, for the triangles in FIG. 4C, the enhanced curve primitive system 102 can classify $\Delta V_1 V_2 R_1$ (E) and $\Delta V_2 V_3 R_2$ (G) as clockwise triangles, $\Delta V_1 V_2 L_1$ (A) and $\Delta V_2 V_3 L_2$ (C) as counter-clockwise triangles, and $\Delta V_2 L_1 L_2$ (B) and $\Delta V_2 R_1 R_2$ (F) as endpoint triangles. The enhanced curve primitive system 102 can similarly classify each triangle in the mesh 408 into one of the four categories.

After classifying the triangles of the mesh 408 into the categories, the enhanced curve primitive system 102 can further analyze endpoint triangles to determine whether the endpoint triangles have a clockwise or a counter-clockwise winding order. For example, the enhanced curve primitive system 102 can identify the winding order of triangles adjacent to each endpoint triangle and classify each endpoint as clockwise or counter-clockwise based on the winding order of the respective neighbor triangles. To illustrate, in FIG. 4C, the enhanced curve primitive system 102 classifies triangle B as an endpoint triangle, because triangle B has a single vertex ($V_2$) along the curve 410. The enhanced curve primitive system 102 can then determine that the triangles adjacent to B (i.e., triangle A and triangle C) are classified as counter-clockwise triangles. Accordingly, the enhanced curve primitive system 102 can determine that triangle B is also a counter-clockwise triangle.

After classifying the triangles (or a subset of triangles) of the mesh 408, the enhanced curve primitive system 102 can identify the triangles that lie along the curve 410. The enhanced curve primitive system 102 can also determine to which side of the curve 410 each triangle belongs. Specifically, the enhanced curve primitive system 102 can utilize the winding order to determine the side of the curve 410 for each triangle. For example, in one or more embodiments, the enhanced curve primitive system 102 can first add all triangles in the mesh 408 that classify into a specific category (e.g., clockwise) to the final mesh as is (i.e., maintaining the original vertices and segments of the polyline of the curve 410 without additional modifications).

The enhanced curve primitive system 102 can then duplicate vertices of the triangles classified into another category (e.g., counter-clockwise) that lie along the curve 410 and replace the original vertices in these triangles with the duplicated vertices. The enhanced curve primitive system 102 can also add the duplicated vertices to a vertex list of the final triangle mesh. Furthermore, the enhanced curve primitive system 102 can connect the duplicated vertices to each other via a plurality of segments along the same positions as the segments of the polyline of the curve 410, thereby duplicating the polyline. Additionally, the enhanced curve primitive system 102 can thus determine that the original set of vertices and segments form a first edge of the discontinuity and the duplicated set of vertices and segments for a second edge of the discontinuity.

By duplicating the vertices along the polyline and determining that the original vertices and the duplicated vertices are unconnected and form separate edges within the mesh 408, the enhanced curve primitive system 102 can ensure that the edges are also unconnected and on opposite sides of the discontinuity from the curve 410. Additionally, the operations described above for generating the discontinuity can generate new vertices at exactly the same positions as the original vertices, which results in no visual discontinuity. Thus, the discontinuity allows the enhanced curve primitive system 102 to modify a color gradient without introducing undesired visual artifacts into a vector-based graphic.

Although FIG. 4C illustrates a specific classification of the triangles in the mesh 408, the enhanced curve primitive system 102 can determine different classifications based on the order in which the enhanced curve primitive system 102 analyzes the vertices. For example, the enhanced curve primitive system 102 may analyze the vertices along the curve 410 in the opposite direction, such that the triangles classified as clockwise and counter-clockwise may be different. In any case, the enhanced curve primitive system 102 can classify the triangles by analyzing the vertices in any order that is consistent for all of the triangles in the mesh 408.

After inserting the discontinuity into a gradient mesh, the enhanced curve primitive system 102 can then update the color gradient based on the presence of the discontinuity in the mesh. In particular, the enhanced curve primitive system 102 can update the color gradient by updating the diffusion coloring of the gradient mesh(es) using the techniques described in U.S. Pat. No. 10,242,646, previously incorporated by reference herein. For example, FIG. 4D illustrates the portion 400 of a vector-based graphic of FIG. 4A after updating the color gradient based on the curve 404 and in connection with color values associated with the first color point 402a and the second color point 402b. Specifically, the enhanced curve primitive system 102 can update the color gradient in response to assigning one or more color values to the edges of the discontinuity corresponding to the curve 404.

As mentioned, the enhanced curve primitive system 102 can determine color value properties for edges of a curve based on user-selected color values or color values associated with a color gradient. To illustrate, in response to a user selection of a color value for a particular side of a curve, the enhanced curve primitive system 102 can modify the color gradient based on the color value assigned to the particular side. Specifically, the enhanced curve primitive system 102 can assign the selected color value to one or more vertices in the indicated side of the discontinuity. More specifically, the enhanced curve primitive system 102 can determine a resultant color at each vertex within a mesh and then diffuse a pixel color for each pixel with the mesh by interpolating between the resultant colors at the plurality of vertices as described in more detail in U.S. Pat. No. 10,242,646. Of course due to the mesh discontinuity, the enhanced curve primitive system 102 can change or add a diffusion coloring to the design as described above.

In at least some embodiments, the enhanced curve primitive system 102 assigns the selected color value to one or more vertices in the middle (or approximately the middle) of the discontinuity. The enhanced curve primitive system 102 can then assign color values to any remaining vertices at the particular edge based on a calculated diffusion based on the color value and distances of vertices from the vertices assigned the selected color value. For example, the enhanced curve primitive system 102 can blend the selected color with one or more color values from the color gradient. To illustrate, in one or more embodiments, the enhanced curve primitive system 102 can compute bi-harmonic weights for each color component at each vertex of the mesh. The enhanced curve primitive system 102 can thus assign different weights for each vertex along an edge to create a sharp color transition. Alternatively, the enhanced curve primitive system 102 can assign the selected color value to every vertex along the particular edge of the discontinuity.

In one or more embodiments, the enhanced curve primitive system 102 can assign a separate color value to each edge of the discontinuity. For example, in response to a user input to assign user-selected color values to both sides of the discontinuity, the enhanced curve primitive system 102 can assign the selected color values to one or more vertices in the corresponding edges of the discontinuity. The enhanced curve primitive system 102 can then blend the selected color values corresponding to the edges of the discontinuity with the colors corresponding to the color gradient while preventing diffusion across the discontinuity.

In additional embodiments, as illustrated in FIG. 4D, the enhanced curve primitive system 102 can determine that none of the edges of the discontinuity are assigned user-selected color values. In particular, the enhanced curve primitive system 102 may determine that the curve 404 is selected as a barrier curve (e.g., no boundary conditions). To illustrate, in response to determining that the curve 404 is a barrier curve, the enhanced curve primitive system 102 can assign color values based on the color gradient, rather than assigning color values based on user-selected colors. Accordingly, the enhanced curve primitive system 102 can determine that the edges of the discontinuity prevent diffusion of the colors associated with the color gradient across the discontinuity. For instance, as shown in FIG. 4D, the enhanced curve primitive system 102 can assign one or more color values associated with color points (e.g., a first color value of the first color point 402a to at least a portion of a left edge of the discontinuity and a second color value of the second color point 402b to at least a portion of the right edge of the discontinuity).

Although the embodiments of FIGS. 4A-4D above include embodiments in which the enhanced curve primitive system 102 applies a color gradient to a portion prior to inserting a curve, in alternative embodiments, the enhanced curve primitive system 102 can apply a color gradient after inserting the curve. For example, the enhanced curve primitive system 102 can receive an additional input to insert the color gradient based on the position of the curve and one or more color points within the portion of the vector-based graphic. Furthermore, the enhanced curve primitive system 102 can receive an input of the curve, and input to insert the color gradient, and then receive an input to convert the curve to a discontinuity in the mesh for the color gradient. Accordingly, the enhanced curve primitive system 102 can generate the color gradient and/or the discontinuity in the gradient mesh in a variety of different ways.

As previously mentioned, the enhanced curve primitive system 102 can also vectorize a raster-based image. The enhanced curve primitive system 102 can determine a color gradient based on color values detected in a raster-based image. For instance, the enhanced curve primitive system 102 can identify a portion of a raster-based image that includes a color gradient with a sharp color transition. The enhanced curve primitive system 102 can detect color values for recreating the color gradient within a vector-based graphic representation and insert appropriate coloring primitives into a region formed by one or more paths. Additionally, the enhanced curve primitive system 102 can detect color values for assigning to the edges of the sharp color transition. Finally, the enhanced curve primitive system 102 can insert the discontinuity with the detected color values according to the processes described above and update the color gradient based on the discontinuity.

Figure 5B:
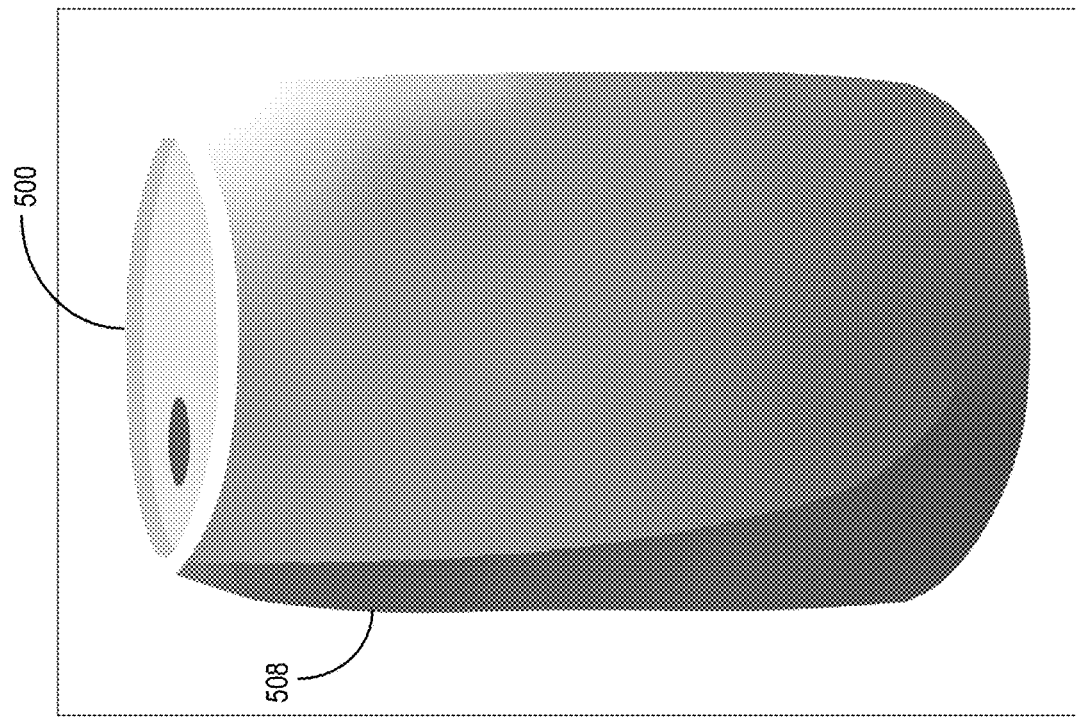
FIGS. 5A-5B illustrate embodiments of a vector-based graphic comprising a color gradient in connection with inserting a curve into a portion of the vector-based graphic in accordance with one or more implementations.
Figure 5A:
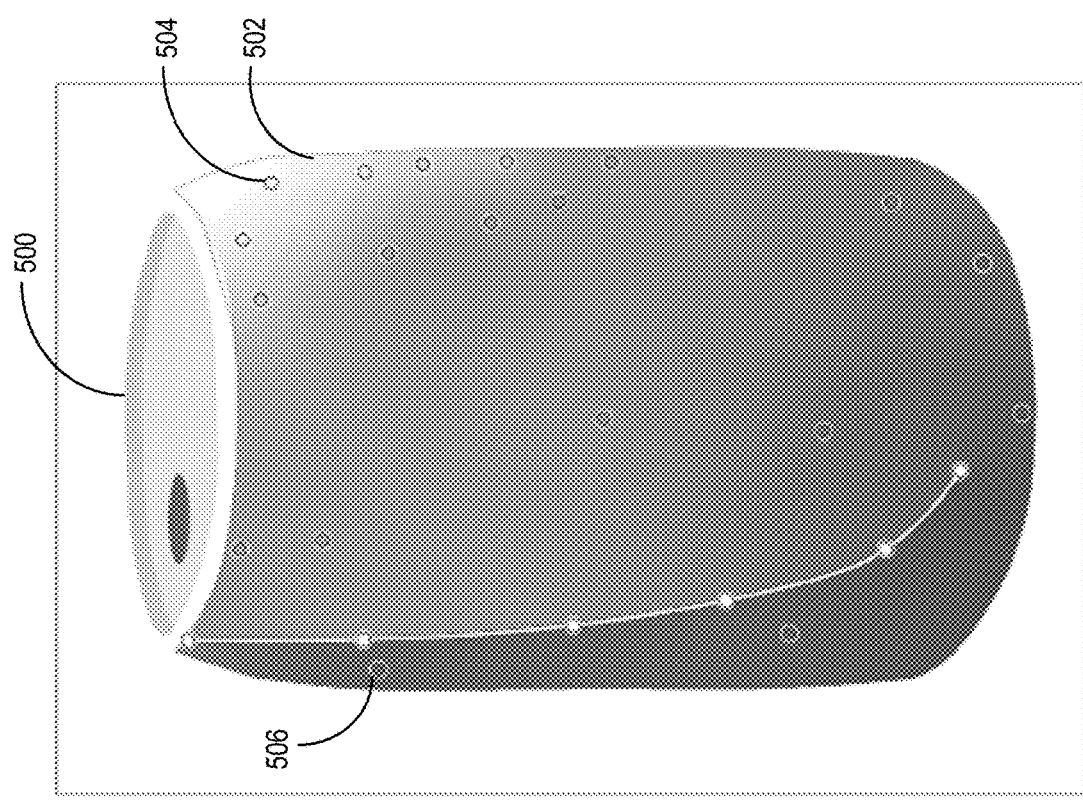

FIGS. 5A-5B illustrate an example vector-based graphic 500 including a color gradient within a portion 502 of the vector-based graphic 500. Specifically, FIG. 5A illustrates that the enhanced curve primitive system 102 can generate a color gradient using color values associated with color points (e.g., color point 504) at a plurality of positions within the portion 502. Additionally, FIG. 5A illustrates a curve 506 inserted into the portion 502 of the vector-based graphic 500 to modify the color gradient. FIG. 5B illustrates a final version of the vector-based graphic 500 with the modified color gradient including a sharp color transition 508 at the position of the curve 506. As shown, inserting the curve 506 into the portion 502 of the vector-based graphic 500 with a color gradient can prevent blending of colors across a discontinuity corresponding to the curve 506 while blending colors around an endpoint of the curve 506.

As described in relation to FIGS. 2 and 4B-4C, the enhanced curve primitive system 102 can perform operations for applying a color gradient with a discontinuity based on an enhanced curve primitive to a vector-based graphic. The operations allow the enhanced curve primitive system 102 to accurately insert a sharp color transition into a color gradient of a vector-based graphic. Accordingly, the acts and operations illustrated and described above in relation to FIGS. 2 and 4B-4C can provide the corresponding acts (e.g., structure) for a step for determining colors to vertices of a discontinuity in the mesh based on a position of the curve within the portion of the vector-based graphic.

Figure 6:
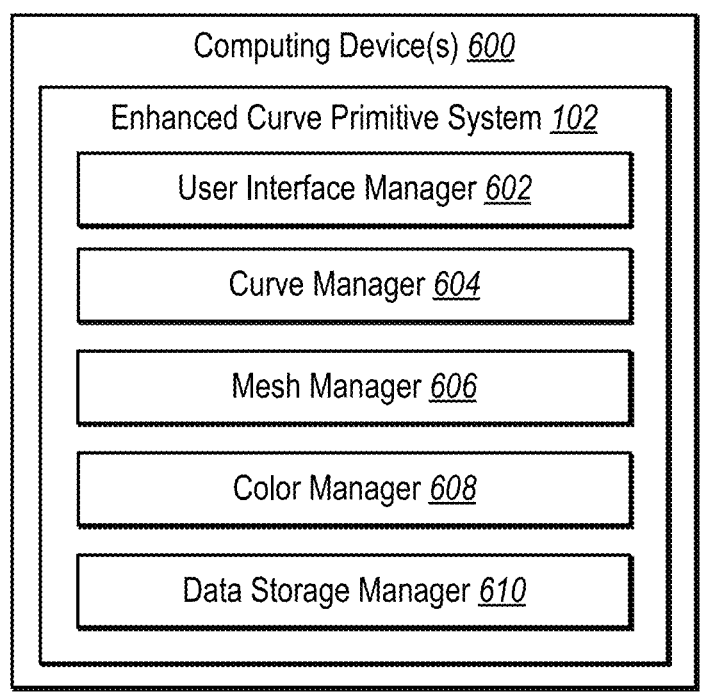
FIG. 6 a diagram of the enhanced curve primitive system of FIG. 1 in accordance with one or more implementations.

FIG. 6 illustrates a detailed schematic diagram of an embodiment of the enhanced curve primitive system 102 described above. As shown, the enhanced curve primitive system 102 can be implemented in a vector image system 110 on computing device(s) 600 (e.g., a client device and/or server device as described in FIG. 1, and as further described below in relation to FIG. 8). Additionally, the enhanced curve primitive system 102 can include, but is not limited to, a user interface manager 602, a curve manager 604, a mesh manager 606, a color manager 608, and a data storage manager 610. The enhanced curve primitive system 102 can be implemented on any number of computing devices. For example, the enhanced curve primitive system 102 can be implemented in a distributed system of server devices for modifying color gradients in vector-based graphics. The enhanced curve primitive system 102 can also be implemented within one or more additional systems. Alternatively, the enhanced curve primitive system 102 can be implemented on a single computing device such as a single client device.

In one or more embodiments, each of the components of the enhanced curve primitive system 102 is in communication with other components using any suitable communication technologies. Additionally, the components of the enhanced curve primitive system 102 can be in communication with one or more other devices including other computing devices of a user, server devices (e.g., cloud storage devices), licensing servers, or other devices/systems. It will be recognized that although the components of the enhanced curve primitive system 102 are shown to be separate in FIG. 8, any of the subcomponents may be combined into fewer components, such as into a single component, or divided into more components as may serve a particular implementation. Furthermore, although the components of FIG. 6 are described in connection with the enhanced curve primitive system 102, at least some of the components for performing operations in conjunction with the enhanced curve primitive system 102 described herein may be implemented on other devices within the environment.

The components of the enhanced curve primitive system 102 can include software, hardware, or both. For example, the components of the enhanced curve primitive system 102 can include one or more instructions stored on a computer-readable storage medium and executable by processors of one or more computing devices (e.g., the computing device(s) 600). When executed by the one or more processors, the computer-executable instructions of the enhanced curve primitive system 102 can cause the computing device(s) 600 to perform the mesh decimation operations described herein. Alternatively, the components of the enhanced curve primitive system 102 can include hardware, such as a special purpose processing device to perform a certain function or group of functions. Additionally, or alternatively, the components of the enhanced curve primitive system 102 can include a combination of computer-executable instructions and hardware.

Furthermore, the components of the enhanced curve primitive system 102 performing the functions described herein with respect to the enhanced curve primitive system 102 may, for example, be implemented as part of a stand-alone application, as a module of an application, as a plug-in for applications, as a library function or functions that may be called by other applications, and/or as a cloud-computing model. Thus, the components of the enhanced curve primitive system 102 may be implemented as part of a stand-alone application on a personal computing device or a mobile device. Alternatively, or additionally, the components of the enhanced curve primitive system 102 may be implemented in any application that provides vector-based graphics editing, including, but not limited to ADOBE® CREATIVE CLOUD® or ADOBE® ILLUSTRATOR® software. "ADOBE", "CREATIVE CLOUD," and "ILLUSTRATOR," are either registered trademarks or trademarks of Adobe Systems Incorporated in the United States and/or other countries.

The enhanced curve primitive system 102 can include a user interface manager 602 for managing a user interface. For example, the user interface manager 602 can manage the display of data (e.g., vector-based graphics and color gradients applied to vector-based graphics) within a user interface on a display device. Additionally, the user interface manager 602 can manage user inputs into the user interface, including user inputs for generating color gradients and/or for modifying color gradients using enhanced curve primitives.

The enhanced curve primitive system 102 can also include a curve manager 604 for managing enhanced curve primitives for modifying color gradients. For example, the curve manager 604 can determine vector information associated with curves for inserting a discontinuity into gradient meshes of vector-based graphics. Additionally, the curve manager 604 can convert curves into polylines in connection with inserting discontinuities into gradient meshes. The curve manager 604 can also manage boundary properties (e.g., color values) associated with curves for modifying color gradients.

The enhanced curve primitive system 102 can further include a mesh manager 606 to manage the generation and modification of a mesh associated with a color gradient. For example, the mesh manager 606 can generate a mesh for a color gradient across a portion of a vector-based graphic. The mesh manager 606 can also modify the mesh by adding vertices to the mesh. To illustrate, in response to an input of a curve into the portion of the vector-based graphic, the mesh manager 606 can modify the mesh by adding vertices of a polyline of the curve into the mesh.

Additionally, the enhanced curve primitive system 102 can include a color manager 608 to manage colors associated with a vector-based graphic. For instance, the color manager 608 can generate a color gradient by applying color values to vertices within a mesh for the color gradient based on color values associated with coloring primitives (e.g., color points or color curves). Additionally, the color manager 608 can utilize properties associated with an enhanced curve primitive for modifying a color gradient to calculate new color values of vertices within a mesh for a color gradient.

Additionally, the enhanced curve primitive system 102 also includes a data storage manager 610 (that comprises a non-transitory computer memory/one or more memory devices) that stores and maintains data associated with vector-based graphics. For example, the data storage manager 610 can store vector information for paths within a vector-based graphic for use in displaying the vector-based graphic on a display device. The data storage manager 610 can also store color information (e.g., color values for vertices within a mesh of a color gradient) for applying color to portions of a vector-based graphic.

Figure 7:
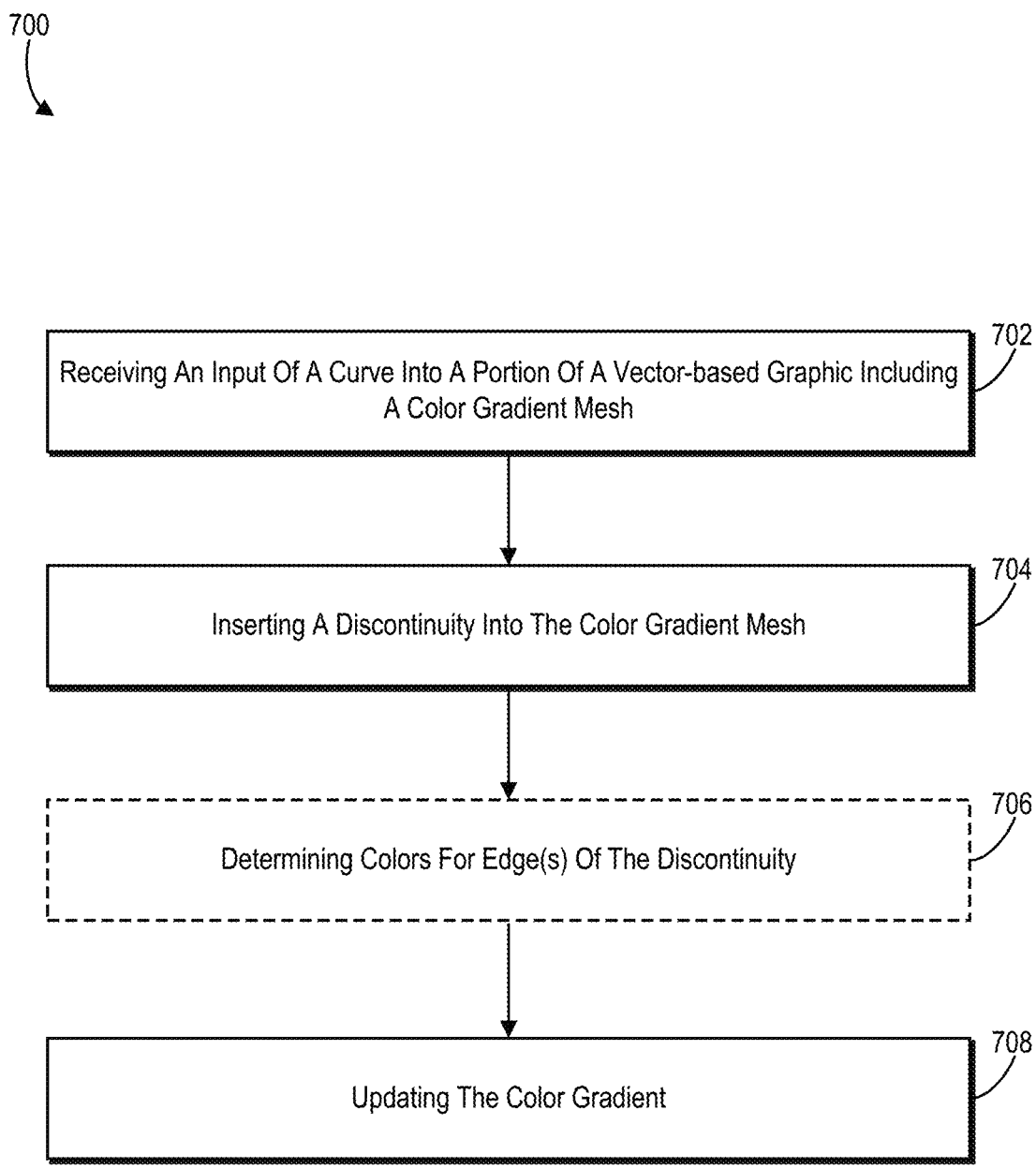
FIG. 7 illustrates a flowchart of a series of acts for generating enhanced curve primitives for a color gradient in a vector-based graphic in accordance with one or more implementations.

Turning now to FIG. 7, this figure shows a flowchart of a series of acts 700 of generating enhanced curve primitives for a color gradient in a vector-based graphic. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7.

As shown, the series of acts 700 includes an act 702 of receiving an input of a curve into a portion of a vector-based graphic including a color gradient mesh. For example, act 702 involves receiving an input of a curve to insert into a portion of a vector-based graphic comprising a mesh for a color gradient applied to the portion of the vector-based graphic. Act 702 can involve identifying the portion of the vector-based graphic based on one or more vector paths that define the portion of the vector-based graphic. Additionally, act 702 can involve receiving an input of a curve comprising a plurality of segments of a curve that form a continuous path. Furthermore, act 702, or an additional act, can involve receiving a plurality of inputs of a plurality of curves to insert into the portion of the vector-based graphic comprising the mesh.

The series of acts 700 also includes an act 704 of inserting a discontinuity into the color gradient mesh. For example, act 704 involves inserting a discontinuity into the mesh at a position of the curve within the portion of the vector-based graphic. Act 704 can involve adding a plurality of vertices to the mesh defining a first edge and a second edge at the position of the curve within the portion of the vector-based graphic, wherein the first edge is disconnected from the second edge. For example, act 704 can involve converting the curve into a polyline comprising a plurality of line segments connected by a plurality of vertices. Additionally, act 704 can involve inserting the plurality of line segments of the polyline into the mesh by connecting the plurality of vertices to existing vertices in the mesh at the position of the curve within the portion of the vector-based graphic.

As part of act 704, or as an additional act, the series of acts 700 can include determining the first edge from the plurality of vertices of the polyline within the mesh. The series of acts 700 can include duplicating the plurality of vertices of the polyline to create a plurality of duplicated vertices, wherein the plurality of vertices are not connected to the plurality of duplicated vertices. The series of acts 700 can then include determining the second edge from the plurality of duplicated vertices within the mesh.

Furthermore, the series of acts 700 can include determining a winding order of vertices within a polygon of the mesh sharing a vertex with the polyline. For example, the mesh can include a triangle mesh comprising a plurality of triangles formed by a plurality of vertices. The series of acts 700 can include classifying the polygon into a first classification or a second classification according to the winding order of the polygon. For example, the first classification can include a clockwise winding order and the second classification can include a counter-clockwise winding order, or vice versa. Additionally, the series of acts 700 can include duplicating the vertex at a position of the vertex along the polyline in response to the polygon being in the first classification. The series of acts 700 can also include classifying a second polygon comprising only one vertex along the polyline into the first classification in response to determining that the second polygon is adjacent a polygon in the first classification.

For example, the series of acts 700 can include duplicating a plurality of vertices at corresponding positions along the polyline in response to a plurality of triangles being in a particular winding classification. The series of acts 700 can then include replacing the plurality of vertices with duplicated vertices in the plurality of triangles.

Additionally, the series of acts 700 include optionally includes an act 706 of determining colors for one or more edges of the discontinuity. For example, act 706 involves determining a first color for a first edge of the discontinuity. Act 706 optionally involve determining and a second color for a second edge of the discontinuity. Act 706 can also involve determining the first color and/or the second color according to selected properties associated with the curve. Act 706 can involve determining the first color for one or more of the plurality of vertices in the first edge. Additionally, act 706 can involve assigning the second color for one or more of the plurality of duplicated vertices in the second edge.

For example, act 706 can involve determining a user-selected edge color for the first edge or the second edge. Furthermore, act 706 can involve determining a color value associated with the color gradient for the first edge or the second edge, wherein determining the color value associated with the color gradient for the first edge or the second edge prevents color diffusion in at least one area of the portion of the vector-based graphic.

The series of acts 700 further includes an act 708 of updating the color gradient based on the determined colors. For example, act 708 involves updating the color gradient in response to placement of the discontinuity. Act 708 can involve reassigning color values to a plurality of existing vertices in the mesh based on a location of the discontinuity in the mesh. For example, act 708 can involve modifying a color diffusion associated with the color gradient within the portion of the vector-based graphic.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
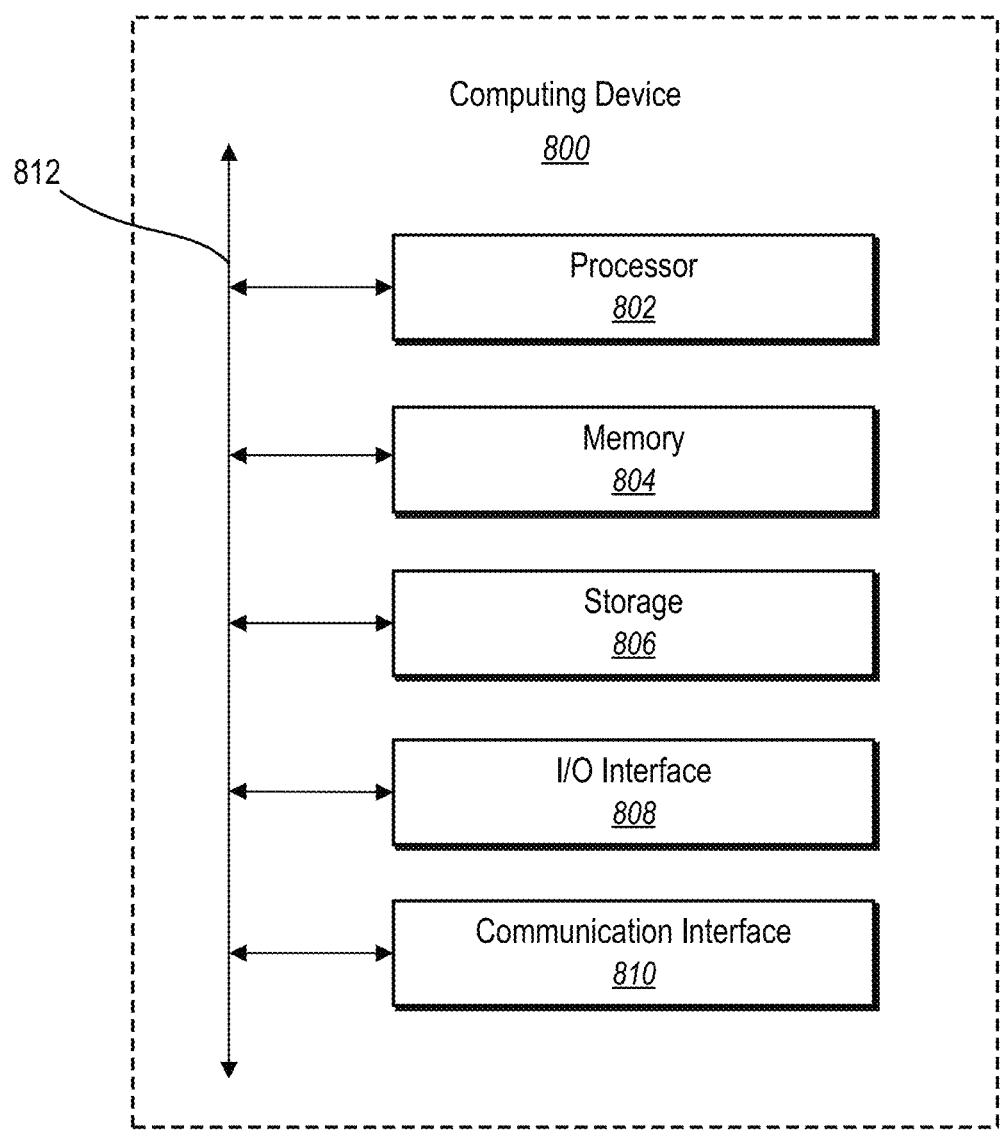
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the system(s) of FIG. 1. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions for dynamically modifying workflows, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions for performing the methods described herein.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example, and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:

receive an input of a curve to insert into a portion of a vector-based graphic comprising a mesh for a color gradient applied to the portion of the vector-based graphic;

insert a discontinuity into the mesh at a position of the curve within the portion of the vector-based graphic;

determine a first color for a first edge of the discontinuity; and update the color gradient in response to determining the first color for the first edge.

2. The non-transitory computer readable storage medium as recited in claim 1, further comprising instructions that, when executed by the at least one processor, cause the computing device to insert the discontinuity into the mesh by:

converting the curve into a polyline comprising a plurality of line segments connected by a plurality of vertices; and inserting the plurality of line segments of the polyline into the mesh by connecting the plurality of vertices to existing vertices in the mesh at the position of the curve within the portion of the vector-based graphic.

3. The non-transitory computer readable storage medium as recited in claim 2, further comprising instructions that, when executed by the at least one processor, cause the computing device to:

determine the first edge from the plurality of vertices of the polyline within the mesh;

duplicate the plurality of vertices of the polyline to create a plurality of duplicated vertices, wherein the plurality of vertices are not connected to the plurality of duplicated vertices; and determine a second edge from the plurality of duplicated vertices within the mesh.

4. The non-transitory computer readable storage medium as recited in claim 3, further comprising instructions that, when executed by the at least one processor, cause the computing device to duplicate the plurality of vertices of the polyline to create the plurality of duplicated vertices by:

determining a winding order of vertices within a polygon of the mesh sharing a vertex with the polyline;

classifying the polygon into a first classification or a second classification according to the winding order of the polygon; and duplicating the vertex at a position of the vertex along the polyline in response to the polygon being in the first classification.

5. The non-transitory computer readable storage medium as recited in claim 3, further comprising instructions that, when executed by the at least one processor, cause the computing device to determine the first color for the first edge of the discontinuity by:

determining the first color for one or more of the plurality of vertices in the first edge.

6. The non-transitory computer readable storage medium as recited in claim 1, further comprising instructions that, when executed by the at least one processor, cause the computing device to determine the first color determine the first edge of the discontinuity by determining the first color according to selected properties associated with the curve.

7. The non-transitory computer readable storage medium as recited in claim 1, further comprising instructions that, when executed by the at least one processor, cause the computing device to determine the first color for the first edge of the discontinuity by detecting assigning of an edge color to the first edge.

8. The non-transitory computer readable storage medium as recited in claim 1, further comprising instructions that, when executed by the at least one processor, cause the computing device to determine the first color for the first edge of the discontinuity by determining a color value associated with the color gradient for the first edge, wherein determining the color value associated with the color gradient for the first edge prevents color diffusion in at least one area of the portion of the vector-based graphic.

9. The non-transitory computer readable storage medium as recited in claim 1, further comprising instructions that, when executed by the at least one processor, cause the computing device to update the color gradient by reassigning color values to a plurality of existing vertices in the mesh in response to determining the first color for the first edge.

10. A system comprising:
at least one computer memory comprising a vector-based graphic; and
one or more servers configured to cause the system to:
receive an input of a curve to insert into a portion of a vector-based graphic comprising a mesh for a color gradient applied to the portion of the vector-based graphic;
insert a discontinuity comprising a first edge and a second edge into the mesh by adding a plurality of vertices to the mesh defining the first edge and the second edge at a position of the curve within the portion of the vector-based graphic, wherein the first edge is disconnected from the second edge; and
update the color gradient by changing colors assigned to one or more vertices in the mesh based on a location of the discontinuity within the mesh.

11. The system as recited in claim 10, wherein the one or more servers are further configured to cause the system to insert the discontinuity into the mesh by:

converting the curve into a polyline comprising a plurality of line segments connected by the plurality of vertices; and inserting the plurality of line segments of the polyline into the mesh by connecting the plurality of vertices to existing vertices in the mesh at the position of the curve within the portion of the vector-based graphic.

12. The system as recited in claim 11, wherein the one or more servers are further configured to cause the system to:
determine the first edge from the plurality of vertices of the polyline within the mesh;
duplicate the plurality of vertices to create a plurality of duplicated vertices; and
determine the second edge from the plurality of duplicated vertices within the mesh.

13. The system as recited in claim 12, wherein the one or more servers are further configured to cause the system to duplicate the plurality of vertices to:

determine a winding order of vertices within a first triangle of the mesh comprising a first vertex and a second vertex along the polyline;

classify the first triangle into a winding classification according to the winding order of the first triangle; and classify a second triangle comprising a third vertex along the polyline into the winding classification in response to determining that the second triangle is adjacent the first triangle.

14. The system as recited in claim 13, wherein the one or more servers are further configured to cause the system to create the plurality of duplicated vertices by:

duplicate the first vertex, the second vertex, and the third vertex at corresponding positions along the polyline in response to the first triangle and the second triangle being in the winding classification; and replace the first vertex, the second vertex, and the third vertex in the first triangle and the second triangle with corresponding duplicated vertices.

15. The system as recited in claim 10, wherein the one or more servers are further configured to cause the system to determine one or more first colors for the vertices in the first edge and one or more second colors for the vertices in the second edge according to selected properties associated with the curve, wherein the selected properties indicate that the curve has no user-selected colors, a user-selected color at one of the first edge or the second edge, or user selected colors at the first edge and the second edge.

16. The system as recited in claim 10, wherein the one or more servers are further configured to cause the system to update the color gradient by reassigning color values to a plurality of existing vertices in the mesh in response to determining the one or more first colors for the vertices in first edge.

17. The system as recited in claim 16, wherein the one or more servers are further configured to cause the system to reassign the color values to the plurality of existing vertices in the mesh by determining a color diffusion based on a first color value associated with the one or more first colors of the vertices in the first edge.

18. A computer-implemented method comprising:

receiving, by at least one processor, an input of a curve to insert into a portion of a vector-based graphic comprising a mesh for a color gradient applied to the portion of the vector-based graphic;

performing a step for determining colors for vertices of a discontinuity in the mesh based on a position of the curve within the portion of the vector-based graphic; and update, by the at least one processor, the color gradient in response to determining the colors for the vertices of the discontinuity.

19. The computer-implemented method as recited in claim 18, wherein updating the color gradient comprises reassigning color values to a plurality of existing vertices in the mesh in response to determining the colors for vertices of the discontinuity.

20. The computer-implemented method as recited in claim 19, wherein reassigning the color values to the plurality of existing vertices in the mesh comprises modifying a color diffusion associated with the color gradient within the portion of the vector-based graphic.

* * * * *